United States Patent
Veldhorst et al.

(10) Patent No.: US 12,536,460 B2
(45) Date of Patent: Jan. 27, 2026

(54) CONTROLLING UNIFORMITY OF AN ARRAY OF QUANTUM DOTS

(71) Applicant: Technische Universiteit Delft, Delft (NL)

(72) Inventors: Menno Veldhorst, Zoetermeer (NL); Nico Willem Hendrickx, Delft (NL)

(73) Assignee: Technische Universiteit Delft, Delft (NL)

( * ) Notice: Subject to any disclaimer, the term of this patent is extended or adjusted under 35 U.S.C. 154(b) by 0 days.

(21) Appl. No.: 18/574,535

(22) PCT Filed: Jun. 30, 2022

(86) PCT No.: PCT/NL2022/050377
§ 371 (c)(1),
(2) Date: Dec. 27, 2023

(87) PCT Pub. No.: WO2023/277690
PCT Pub. Date: Jan. 5, 2023

(65) Prior Publication Data
US 2024/0289673 A1   Aug. 29, 2024

(30) Foreign Application Priority Data
Jun. 30, 2021 (NL) .................................. 2028596

(51) Int. Cl.
*G06N 10/40* (2022.01)
*B82Y 10/00* (2011.01)
*H10D 48/00* (2025.01)

(52) U.S. Cl.
CPC ............. *G06N 10/40* (2022.01); *B82Y 10/00* (2013.01); *H10D 48/383* (2025.01)

(58) Field of Classification Search
CPC ...... G06N 10/40; B82Y 10/00; H10D 48/383; H10D 30/402; H10D 64/27; H10D 48/3835
(Continued)

(56) References Cited

U.S. PATENT DOCUMENTS 10,635,990 B1   4/2020 Park et al.
10,692,924 B2   6/2020 Dzurak et al.
(Continued)

FOREIGN PATENT DOCUMENTS

| EP | 3401848 A1 * | 11/2018 | ......... H01L 23/5226 |
|---|---|---|---|
| WO | 2018084878 A1 | 5/2018 | |
| WO | 2021092661 A1 | 5/2021 | |

OTHER PUBLICATIONS

Jones et al. "Logical Qubit in a Linear Array of Semiconductor Quantum Dots", Physical Review, Jun. 1, 2018, pp. 021058-1-021058-31.
(Continued)

*Primary Examiner* — Arnold M Kinkead
(74) *Attorney, Agent, or Firm* — Steven M. Koehler; Westman, Champlin & Koehler, P.A.

(57) ABSTRACT

A method of controlling random charge effects originating from local defects (202-1, 202-2, 202-3) above a quantum dot in a quantum dot array is described, wherein the method comprises: selecting one or more electrodes (Vg, Vb) configured to control one or more quantum structures formed in one or more semiconductor layers arranged on a substrate; and, applying one or more first voltage pulses (inset) to the one or more selected electrodes, the amplitude of the one or more first voltage pulses being selected to induce a shift in one or more charge states (210-1, 210-2, 210-3) of one or more offset charges in one or more dielectric, semiconductor and/or interface layers between the one or more selected electrodes (Vg, Vb) and the one or more semiconductor
(Continued)

layers in which the one or more quantum dots are formed by the application of voltages on one or more electrodes (Vg, Vb).

20 Claims, 20 Drawing Sheets

(58) Field of Classification Search
USPC .......................................... 326/1, 7; 257/14
See application file for complete search history.

(56) References Cited

U.S. PATENT DOCUMENTS

| 10,845,496 | B2 | 11/2020 | Leipold et al. |
| 2015/0279981 | A1 | 10/2015 | Eriksson et al. |
| 2017/0317203 | A1 | 11/2017 | Petta et al. |
| 2018/0331108 | A1 | 11/2018 | Hutin et al. |
| 2019/0252377 | A1 | 8/2019 | Clarke et al. |
| 2020/0027972 | A1 | 1/2020 | Petta et al. |
| 2021/0296480 | A1 | 9/2021 | Clarke et al. |

OTHER PUBLICATIONS

Lawrie et al. "Quantum Dot Arrays in Silicon and Germanium", Applied Physics Letter, Feb. 24, 2020, pp. 080501-1-080501-9, vol. 116.
Li et al. "Crossbar Network for Silicon Quantum Dot Qubits", Science Advances, Jul. 2018, 10 pages, vol. 4, No. 7.
Sammak et al. "Shallow and Undoped Germanium Quantum Wells: A Playground for Spin and Hybrid Quantum Technology", Advanced Functional Materials, Jan. 23, 2019, 8 pages, vol. 29, No. 14.
Veldhorst et al. "Silicon CMOS Architecture for a Spin-Based Quantum Computer", Nature Communications, Dec. 15, 2017, 8 pages, vol. 8, No. 1766.
Vinet et al. "Towards Scalable Silicon Quantum Computing", 2018 IEEE International Electron Devices Meeting, Dec. 1, 2018, 4 pages.
Wu et al. "Variability and Fidelity Limits of Silicon Quantum Gates Due to Random Interface Charge Traps", IEEE Electron Device Letters, Jul. 2020, pp. 1078-1081, vol. 41, No. 7.
International Search Report and Written Opinion in corresponding International Application No. PCT/NL2022050377 dated Oct. 10, 2022.

* cited by examiner

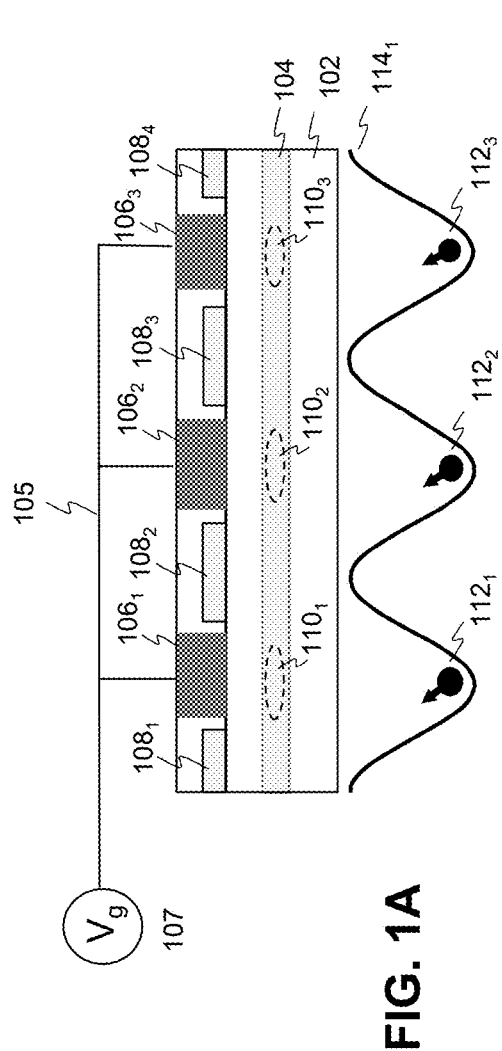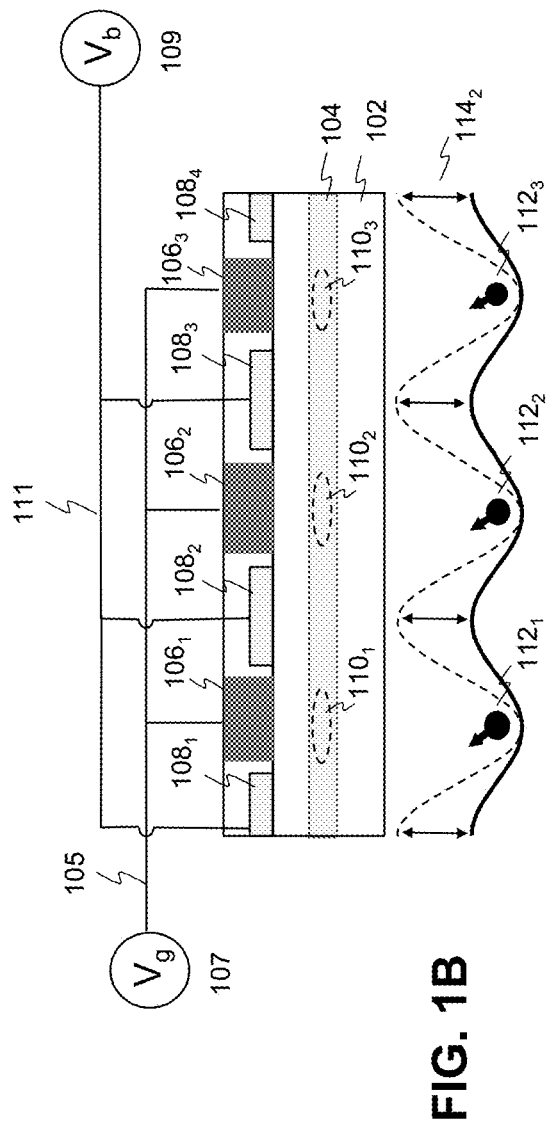
FIG. 1A
FIG. 1B

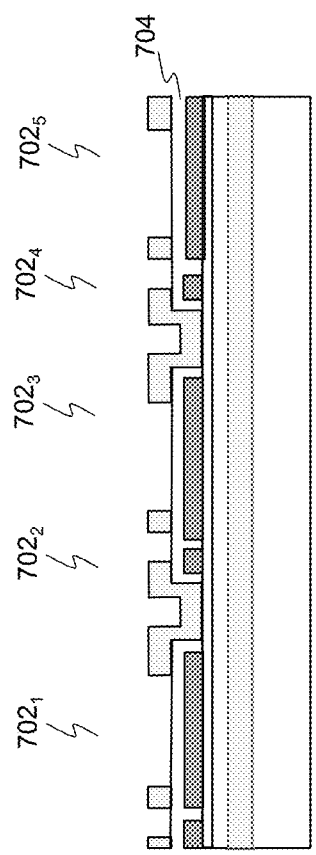
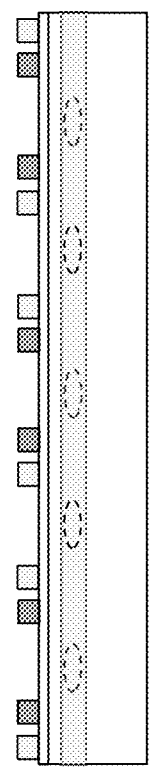
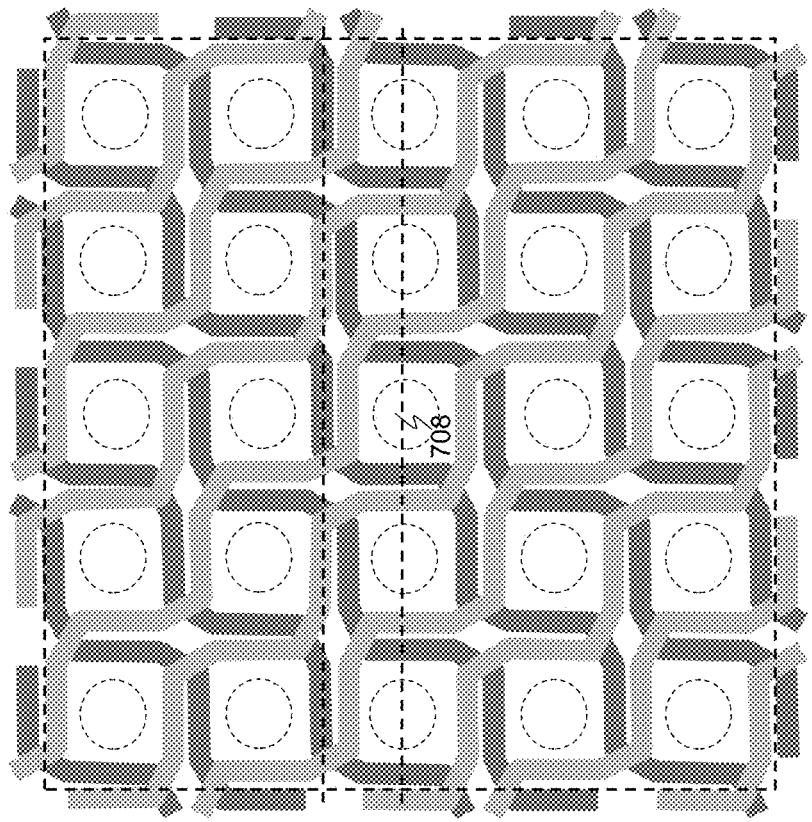
FIG. 7B
FIG. 7C
FIG. 7A

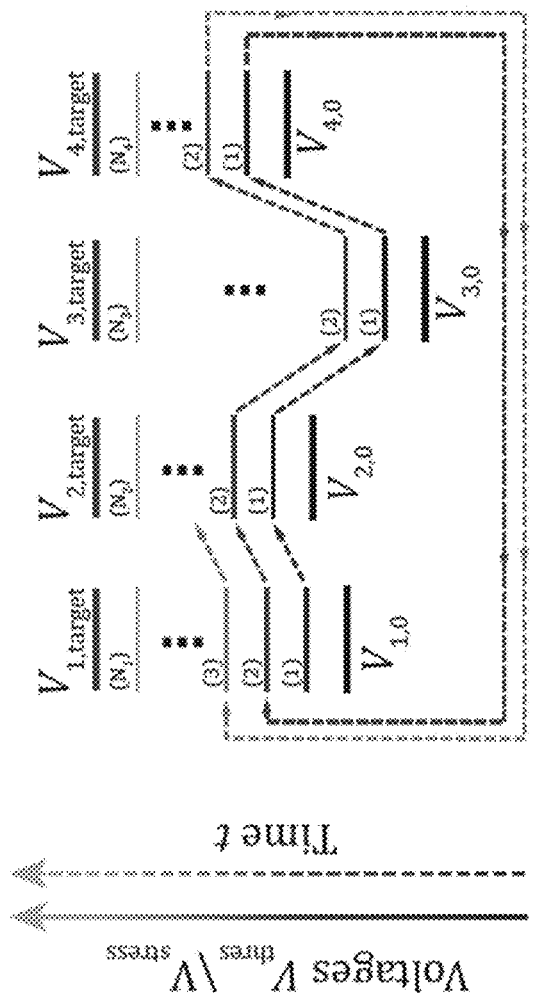

FIG. 16C

1602 — determining initial threshold values for each of the gate electrodes or sets of gates electrodes of the quantum dot array.

↓

1604 — applying stress voltages to the gate electrodes or sets of gate electrodes wherein the stress voltages are selected to be higher than the initial threshold values in order to increase the threshold voltages for each of the gate electrodes or sets of gate electrodes towards a target threshold voltage;

↓

1606 — repeating the application of stress voltages to the gate electrodes or sets of gate electrodes, wherein the stress voltages are selected to be higher than the threshold values of the gate electrodes or set of gate electrodes, until the threshold voltages for each of the gate electrodes or sets of gate electrodes have reached the target threshold voltage;

FIG. 16E

CONTROLLING UNIFORMITY OF AN ARRAY OF QUANTUM DOTS

CROSS-REFERENCE TO RELATED APPLICATION(S)

This application is a Section 371 National Stage Application of International Application No. PCT/NL2022/050377, filed Jun. 30, 2022 and published as WO 2023/277690 A1 on Jan. 5, 2023, in English, and further claims priority to Netherlands application Ser. No. 2028596, filed Jun. 30, 2021, the contents of which are hereby incorporated by reference in their entirety.

FIELD OF TECHNOLOGY

The invention relates to controlling uniformity of an array of quantum dots, and, in particular, though not exclusively, to methods of controlling uniformity of an array of quantum dots and arrays of quantum dots comprising a coupling structure configured to locally controlling uniformity of an array of quantum dots.

BACKGROUND

Increasing the number of qubits of a qubit processer will present technological challenges including interconnects, imperfect device yield, qubit calibration and qubit readout. Quantum dot qubits constitute a promising platform, however a key challenge in scaling quantum dot qubits is to overcome a so-called interconnect bottleneck. Quantum dot devices have been limited to small and linear arrays and scaling to larger systems has not been realized. Current approaches to scale quantum dot systems encompass sparse arrays, which will limit functionality and operation, or brute-force methods such as stacking many different control layers, which will severely limit the size of the two-dimensional array. For example, U.S. Pat. No. 10,692,924 and the article *Silicon CMOS architecture for a spin-based quantum computer*, Nature Communications, 8: 1766, by Veldhorst et al. described operation of a 2D array of qubits operated by a CMOS circuit layer that is provided over the 2D qubit array. These designs are based on local transistor-controlled charge detection but require extensive downscaling and new design of the CMOS circuitry.

A further scheme is based on shared control, wherein multiple plunger and/or barrier gates are controlled via a single shared line. For example, Li et al., propose in their article *a crossbar network for silicon quantum dot qubits*, Sci. Adv. 2018, a large scale 2D qubit array based on a crossbar design for controlling a large number of qubits. The design, which includes gate lines that are shared by multiple qubits, provides a relatively simple and scalable wiring structure for a qubit processor. The design however requires uniform fabrication parameters to ensure limited variability in threshold voltage, charging energy and tunnel coupling between different sites. Such accurate control of the variability between qubits still poses significant challenges. Moreover, the shared line does not provide local control in the two-dimensional array of quantum dots. The requirements on the uniformity are well beyond any practical demonstration in the literature, thus questioning its feasibility.

Wu et al, describe in their article Variability and fidelity limits of silicon quantum gates due to random interface charge traps, IEEE Electron Device Letters (Volume: 41, Issue: 7, July 2020), describes the study of the influence of random interface charge traps on the fidelity of silicon quantum gate devices. The authors conclude that so-called composite gate pulses that were proposed in the prior art to reduce the influence of random interface charge traps may have some effect but cannot provide the type of device uniformity that is required for controlling large-area quantum dot arrays.

Hence, from the above it follows that there is a need in the art for methods of controlling uniformity of an array of quantum dots and arrays of quantum dots comprising a coupling structure configured to locally controlling uniformity of an array of quantum dots.

SUMMARY

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Functions described in this disclosure may be implemented as an algorithm executed by a microprocessor of a computer. Furthermore, aspects of the present invention may take the form of a computer program product embodied in one or more computer readable medium(s) having computer readable program code embodied, e.g., stored, thereon.

In an aspect, the embodiments in this disclosure may relate to a method of controlling random electrostatic potential fluctuations in quantum dot structures wherein the method may comprise: selecting one or more gate electrodes, for example plunger electrodes or barrier electrodes, of a plurality of gate electrodes configured to electrostatically control a gate-based quantum structure, e.g. a plurality of quantum dots, formed in one or more semiconductor layers arranged on a substrate; and, applying one or more first voltage pulses to a selected gate electrode or a set of selected gate electrodes, wherein the amplitude of the one or more first voltage pulses is selected to modify at least part of the electrostatic potential fluctuations.

In an embodiment, at least part of the electrostatic potential fluctuations may be caused by: variations in critical dimensions of the quantum dot structures and/or random offset charges in one or more dielectric layers, semiconductor layers and/or interface layers between the one or more selected electrodes and the one or more semiconductor layers in which the quantum dots are formed.

In an embodiment, the method may further include: measuring a modification in at least part of the electrostatic potential fluctuations in response to the application of the one or more first voltage pulses.

In a further embodiment, the modification may be measured by determining a change in the threshold voltage associated with the selected gate electrode or set of selected gate electrode. Here, the threshold voltage may be defined as a minimum gate voltage value at which conductance through the plurality of quantum dots can be measured.

Hence, one or more voltage pulses may be applied to an electrode structure configured to control quantum structures, e.g. quantum dots, formed in one or more semiconductor layers. For example, a number of voltage pulses may be applied to the gate electrode of the quantum structure, wherein the amplitude of voltage pulses are selected to be higher than the typical working voltage of the quantum structure, e.g. a quantum dot structure. Here, the voltage range of the working voltage that is typically used to tune the quantum structure in the few electron regime, wherein the quantum structure, e.g. a quantum dot, may contain either zero, one or two electrons (or holes). Typically, this means that the amplitude of voltage pulses are selected to be higher than the threshold voltage associated with the selected gate electrode or set of selected gate electrode. Here, the threshold voltage is defined as a minimum gate voltage value at which conductance through the plurality of quantum dots can be measured. It is well known in the field that such threshold voltage can be derived from current-gate voltage characteristics of quantum structure.

Application of the pulses may cause a one or more changes in the electrostatic potential fluctuations. This may be caused by changes in the states of random offset charges, e.g. a (partial) filling or emptying of the charge states of traps and/or defects, in layers between the electrodes and the quantum structures so that the local effect of the charge states is neutralized or at least substantially reduced. This way, the local electric fields due to random offset charges may be equalized. After the application of the pulses, the quantum structures may response substantially identical to a gate voltage that is used to tune the quantum structures to a working regime, e.g. a few charge carrier regime. This process may be repeated for other electrodes so that substantially all quantum structures are subjected to the random offset charge equalization process.

In an embodiment, the method may further include: determining a first sensor response in response to the application of the one or more first voltage pulses using a sensor, the sensor response being indicative of the presence of a shift in the one or more charge states.

In an embodiment, the sensor may be a charge sensor, a current sensor or a dispersive sensor.

In an embodiment, the charge sensor may comprise a single electron tunneling (SET) transistor, the SET transistor comprising a source and a drain connected by tunneling junctions to a conductive island, preferably the SET transistor being formed in or over the one or more semiconductor layers.

In an embodiment, the determining of the first response may further comprise: controlling the sensor to measure a first charge state of the one or more quantum structures before applying the one or more first voltage pulses; controlling the sensor to measure a second state of the one or more quantum structures after applying the one or more first voltage pulses; determining based on the first and second charge state whether a shift in the one or more charge states has occurred.

In an embodiment, the method may further include: if the sensor response indicates a shift, applying one or more further voltage pulses and determining one or more further sensor responses of the one or more quantum structures until the one or more further sensor responses indicate that no further shift is required for device operation. No further shift is required for example if the quantum structures behave in a substantially uniform way.

In an embodiment, a plurality of quantum structures may be formed in one or more semiconductor layers.

In an embodiment, the one or more electrodes may include one or more gate electrodes, each gate electrode being connected to a plurality of plunger gates, each plunger gate being arranged to form a quantum well in the plurality of quantum structures.

In an embodiment, the one or more electrodes may include one or more barrier gate electrodes for controlling a barrier region between neighboring quantum structures in the plurality of quantum structures.

In an embodiment, least two barrier electrodes may be configured to locally control a barrier region between neighboring quantum structures.

In an embodiment, the SET transistor may be formed in the one or more semiconductor layers and wherein one end of the first metallic via and one end of the second metallic via form ohmic contacts, preferably a nano-scale ohmic contacts, more preferably a metal germanium-based ohmic contacts, with the one or more semiconductor layers.

In an embodiment, the one or more quantum structures include one or more quantum dot regions. In the embodiment, the one or more quantum structures include a one dimensional, two dimensional or three dimensional array of quantum dots.

In an embodiment, the quantum dot regions may comprise nano wires or a hut wires.

In an embodiment, an offset charge may be at least one of a: trap, defect, donor or acceptor implant, quantum dot region, formed in in the dielectric, semiconductor and/or interface layers between the one or more selected electrodes and the one or more semiconductor layers in which the one or more quantum structures are formed.

In a further aspect, the invention may relate to a controller configured to controlling charge effects in a semiconductor structure, wherein the controller is configured to: select one or more electrodes configured to control one or more quantum structures formed in one or more semiconductor layers arranged on a substrate; and, apply one or more first voltage pulses to the one or more selected electrodes, the amplitude of the one or more first voltage pulses being selected to induce a shift in one or more charge states of one or more offset charges in one or more dielectric, semiconductor and/or interface layers between the one or more selected electrodes and the one or more semiconductor layers in which the one or more quantum structures.

In an embodiment, the controller is further configured to: control a sensor to determine a first sensor response in response to the application of the one or more first voltage pulses using a sensor, the sensor response being indicative of the presence of a shift in the one or more charge states.

In an embodiment, controlling the sensor to determine a first sensor response may further comprise: controlling the sensor to measure a first charge state of the one or more quantum structures before applying the one or more first voltage pulses; controlling the sensor to measure a second state of the one or more quantum structures after applying the one or more first voltage pulses; determining based on the first and second charge state whether a shift in the one or more charge states has occurred.

In an embodiment, the controller may be further configured to: if the sensor response indicates a shift, applying one or more further voltage pulses and determining one or more further sensor responses of the one or more quantum structures until the one or more further sensor responses indicate that no shift occurs in response to the one or more further voltage pulses.

In a further aspect, the embodiments may relate to a method for equalizing electrostatic potential fluctuations, in particular dot-to-dot fluctuations, in an array of quantum dots comprising the steps of:
  determining initial threshold values for each of the gate electrodes or sets of gates electrodes of a quantum dot array;
  applying stress voltages to the gate electrodes or sets of gate electrodes wherein the stress voltages are selected to be higher than the initial threshold values in order to increase the threshold voltages for each of the gate electrodes or sets of gate electrodes towards a target threshold voltage; and, repeating the application of stress voltages to the gate electrodes or sets of gate electrodes, wherein the stress voltages are selected to be higher than the threshold values of the gate electrodes or set of gate electrodes, until the threshold voltages for each of the gate electrodes or sets of gate electrodes have reached the target threshold voltage.

The embodiments further relate to a controller that is configured to execute the steps of the method for equalizing electrostatic potential fluctuations.

The methods described above can be used to equalize any type of electrostatic gate that is used for controlling a quantum dot, including but not limited to plunger gates and/or barrier gates, including single and multi-barrier gate structures. Although the methods can be applied to any type of quantum dot array, e.g. a linear quantum dot array or a 2D quantum dot arrays. Further, schemes can be applied to different quantum dot implementation, e.g. silicon or germanium quantum dot devices.

Further, in an embodiment, instead of or in addition to tuning the threshold voltages of the gates by applying a stress voltage to an individual gate, the scheme may also include applying a stress voltage to two or more combined gates. In another embodiment, the method may also include measuring the threshold voltage of the selected gate or set of selected gates and use the measured threshold voltage do determine the next stress voltage. Additionally, in an embodiment, instead of defining one target voltage for all gates, different target voltages for different gates may be defined. This way, the method may be used to tune the threshold voltage of a first set of gates to a first target voltage value and a second set of gates to a second target voltage value.

The embodiments may also relate to a program product comprising software code portions configured for, when run in the memory of a computer, executing the method steps according to any of the embodiments described in this application. The invention will be further illustrated with reference to the attached drawings, which schematically will show embodiments according to the invention. It will be understood that the invention is not in any way restricted to these specific embodiments.

BRIEF DESCRIPTION OF THE DRAWINGS

FIGS. 1A and 1B depict schematics of part of a large-area two-dimensional quantum dot array comprising an electrode structure.

FIG. 7A-7C depict a top view and two cross sections of the semiconductor structure according to an embodiment of the invention comprising a double barrier electrode structure;

FIG. 15-15D illustrate the effect of electrostatic potential fluctuations in semiconductor heterostructures comprising quantum dot devices;

FIG. 16A-16E show a scheme for equalizing the electrostatic potential fluctuations below gates of a quantum element, such as an array of quantum dots according to an embodiment of the invention.

DETAILED DESCRIPTION

Figures 2A, 2B:
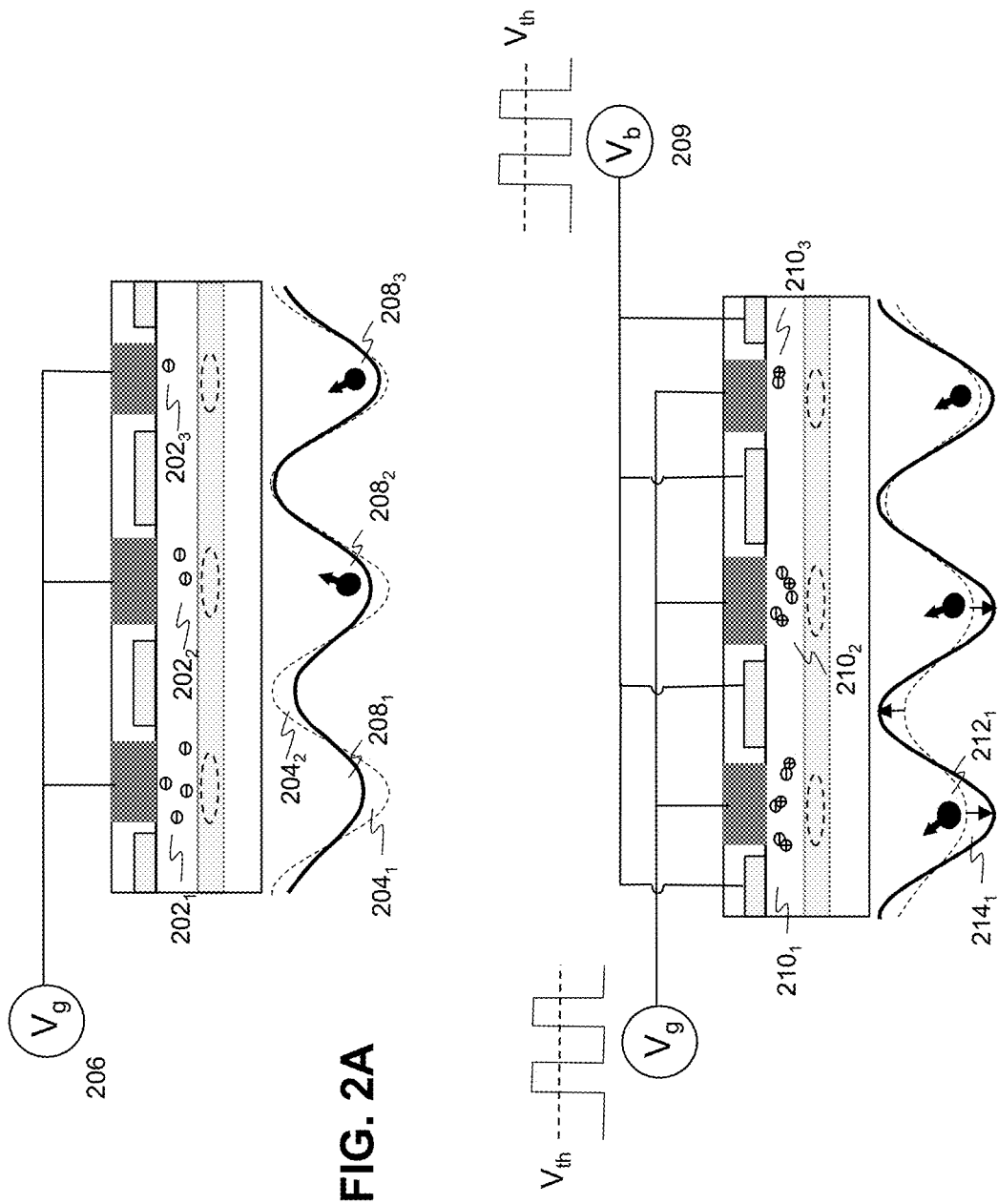
FIGS. 2A and 2B depict schematics of a barrier electrode structure for a quantum dot array according to an embodiment of the invention.

The embodiments in this disclosure describe structures and methods for controlling quantum dot uniformity. In particular, the embodiments in this disclosure aim to provide structures and methods that allow reducing of the variability between a plurality of quantum structures, e.g. quantum dots, formed in one or more semiconductor layers. Reduction of the variability between the quantum structures is important in for providing an array of quantum structures in which each quantum structure can be reliably operated as a qubit. The variability between the quantum structures may be caused by fluctuations in the critical dimensions of the quantum dot structures, e.g. gate and barrier structures, and by charge traps, impurities, donor and/or acceptors and/or defects that may exist in the layers, e.g. semiconductor and/or dielectric layers, between the semiconductor layers in which the quantum dot regions, e.g. quantum wells, are formed and the electrode structures for controlling the quantum dots. This variability makes the use of a common electrode to control a plurality of quantum structures, e.g. a common electrode connected to a plurality of plunger gates, difficult or even not possible. To address this problem, the embodiments in this disclosure describe structures and methods that can be used to compensate effects due to the variability so that common electrode structures for controlling quantum dot arrays can be used. The examples hereunder are described with reference to gate inducted quantum dot structures, however it is submitted that the invention is not limited to such quantum dot structures but can be applied to any type of electrode-controlled quantum structure that is sensitive to offset charges.

FIGS. 1A and 1B depict schematics of part of a large-area two-dimensional quantum dot array comprising an electrode structure. The electrode structure may comprise electrodes wherein each electrode controls a plurality of quantum dots, e.g. a row of quantum dots, in the quantum dot array. FIGS. 1A and 1B depict a cross-section of a typical quantum dot structure comprising quantum dot regions which can be configured as qubits. It is noted that the figures only a show a small part of the quantum dot array, which may comprise a large number of quantum dot regions. The figure includes one or more semiconductor layers 104 arranged on a substrate 102. The electrode structures for forming and controlling a plurality of quantum dot regions in the one or more semiconductor layers may be formed over the one or more semiconductor layers. The substrate and the one or more semiconductor layers may form a layered semiconductor stack that is suitable for the formation of quantum dot arrays.

Suitable silicon-compatible systems for forming quantum structures include silicon-germanium heterostructures and silicon metal-oxide-semiconductor (SiMOS) structures. Examples of such structures are describe in the article by Lawrie et al, *Quantum Dot Arrays in Silicon and Germanium*, Appl. Phys. Lett. 116, 080501 (2020), which is hereby incorporated by reference into this application. For example, in an embodiment, the semiconductor layer stack may include a Silicon substrate, an intrinsic Silicon layer, an isotopically purified Silicon ($^{28}$Si) epitaxial layer and a SiO2 layer. In another embodiment, the semiconductor layer stack may include a Si/SiGe heterostructure formed on a Silicon substrate, wherein the Si/SiGe heterostructure may include a graded $Si_{1-x}Ge_x$ layer and an isotopically purified Silicon ($^{28}$Si) epitaxial layer between two SiGe layers. In another embodiment, the semiconductor layer stack may include a Ge/SiGe heterostructure formed on a Silicon substrate, wherein the Ge/SiGe heterostructure includes a Germanium layer formed on the Silicon substrate followed by a reversed graded $Si_{1-x}Ge_x$ and a Ge epitaxial layer between two SiGe layers. Other suitable systems for forming quantum structures include nanowires, hut wires, self-assembled quantum dots, etc.

The electrodes structures may be electrically isolated from the semiconductor layers by one or more insulating layers between the semiconductor layers and the electrode structures. The electrode structures may include a gate structure, i.e. a plurality of plunger gates $106_{1-3}$ connected to a common gate electrode 105. By applying a voltage 107 to the gate electrode quantum well regions $110_{1-3}$ may be formed under the plunger gate in the one or more semiconductor layers in which charge carriers are laterally confined. The voltage of the gate electrode may be tuned such that a quantum well is formed. The gate voltage may be tuned such that exactly one charge carrier $112_{1-3}$ (e.g. an electron or a hole) is confined in each of the quantum well. This voltage will typically determine the working voltage of the quantum dots. The charge carrier is trapped in a potential well which are separated by barrier potentials located between the quantum dot regions. The height of the potential barriers $114_{1,2}$ may be controlled by barrier electrodes $108_{1-4}$ which also may be connected to a common barrier electrode 111 to control barrier electrodes between the quantum dots as depicted in FIG. 1B. As shown in this figure, applying a barrier voltage Vb to the barrier gate may control the barrier height $114_{1,2}$, e.g. lower the barrier, so that charge carriers configured as qubits may interact with each other.

A problem associated with the structures shown in FIGS. 1A and 1B is that the architecture that is based on common gate and/or common barrier electrode structures heavily relies on a high level of uniformity regarding the materials and critical dimensions of the gate electrodes. In particular, inter-dot variations may have the effect that a gate voltage applied to the common plunger gates will no longer have the effect that each dot is tuned to the same potential. Further, such local variability may also have the effect that not every dot will have a charge carrier configured in the quantum well. This effect is schematically shown in FIG. 2A, wherein fluctuations in the critical dimensions of the quantum dot structures, e.g. gate and barrier structures, and by charge traps and/or defects that may exist in the semiconductor layers in which the quantum dot regions, e.g. quantum wells, are formed, in the insulating layers between the semiconductor layers or in the interfaces between the semiconductor layers, between the insulating layers and between semiconductor and insulator layers. These charge traps and/or defects are sometimes referred to as offset charges.

In this example, local charge traps and/or defects $202_{1-3}$ in the dielectric of the interface between the semiconductors and the gate structures may locally change the electric field if a gate voltage $V_g$ 206 is applied. For example, charge traps and/or defect states under the first plunger gate may locally change the electrical field so that a predetermined gate voltage no longer allows formation of a quantum well $208_1$ comprising one single charge carrier, while the same gate voltage creates quantum wells $208_{2,3}$ comprising a single charge carrier for the other plunger gate electrodes. Additionally, even if quantum wells comprising one charge carrier are formed, the charge traps and/or defects states may locally change the shape of the potential well of a charge carrier. This will affect the uniformity of the characteristics, e.g. the energy levels, of the quantum dot that is necessary for controlling the quantum dots as qubits.

To address this problem, before operating the quantum dots, one or more pulses may be applied the electrodes of the electrode structure of the quantum dot array. For example, as shown in FIG. 2B, a number of pulses may be applied to the gate electrode at a voltage that is (substantially) higher than the typical working voltage of the quantum dots, i.e. the voltage range that is typically used to tune the dots in the few electron regime wherein a dot can have either zero, one or two electrons (or holes). Hence, the amplitude of voltage pulses are selected to be higher than the threshold voltage associated with the selected gate electrode or set of selected gate electrode. Here, the threshold voltage is defined as a minimum gate voltage value at which conductance through the plurality of quantum dots can be measured. The threshold voltage separates the few electron regime from a regime wherein the currents runs through the plurality of quantum dots. It is well known in the field that such threshold voltage can be derived from current-gate voltage characteristics of quantum structure. Examples of such characteristics are provide in FIGS. 15 and 16 below.

Application of the pulses may cause (partial) filling or emptying of the charge states of traps and/or defects in the dielectric so that the local effect of the charge states is neutralized or at least substantially reduced. This way, the local electric fields due to random charge states may be equalized. After, the application of the pulses, the quantum dots will respond substantially identical to a gate voltage that is used to set the quantum dots in the few charge carrier regime. This process may be repeated for other gate electrodes so that substantially all quantum dot areas are subjected to the offset charge equalization process. [add repetitively measuring I-V curves, determining threshold voltages as a function of gates and tuning the threshold of each voltages gate to a target gate value]

Instead of and/or in addition to the application of the pulses to the gate electrodes or plunger gates, a similar scheme may be used to apply voltage pulses to the barrier electrodes. In an embodiment, the barrier electrodes may be configured as common barrier gates as illustrated with reference to FIG. 1B. This will may equalize the effect of offset charges that are in the barrier region between neighboring quantum dot regions.

In yet a further embodiment, a quantum dot array may be configured as an addressable barrier electrode structures. In this embodiment, the barrier electrode structures allow locally applying a signal to a barrier region between a quantum dot pair in a quantum dot array. In that case, it is possible to locally apply a series of voltage pulses to a barrier region wherein the voltage pulses are sufficiently high to cause (partial) filling of the charge states of traps and/or defects in the dielectric. This way, voltage pulses may be locally applied to any barrier region in the quantum dot array to equalize offset charges that may cause variability between the different quantum dots.

Figure 3A:
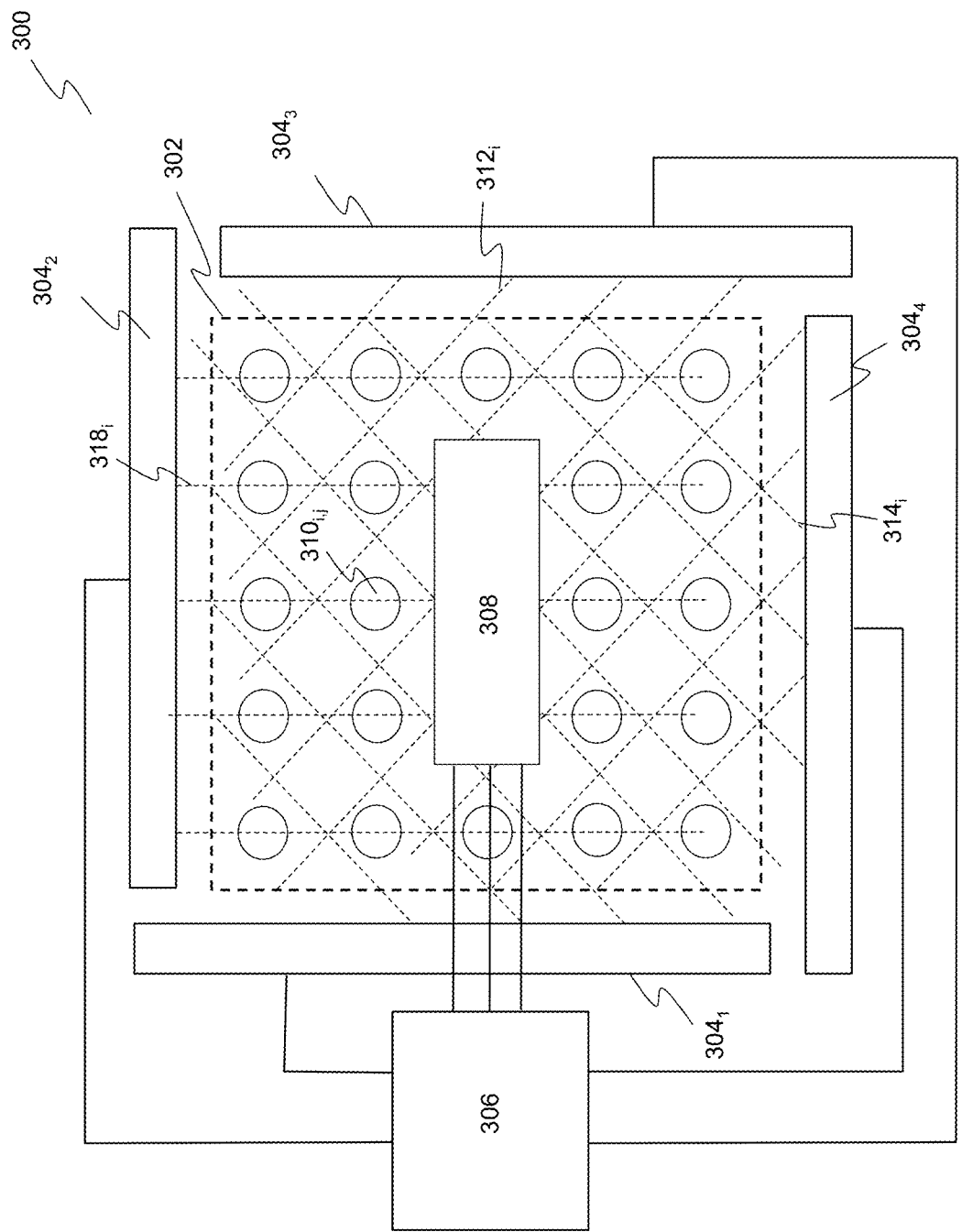
FIGS. 3A and 3B depict barrier electrode structures for a quantum dot array according to various embodiments of the invention.
Figure 3B:
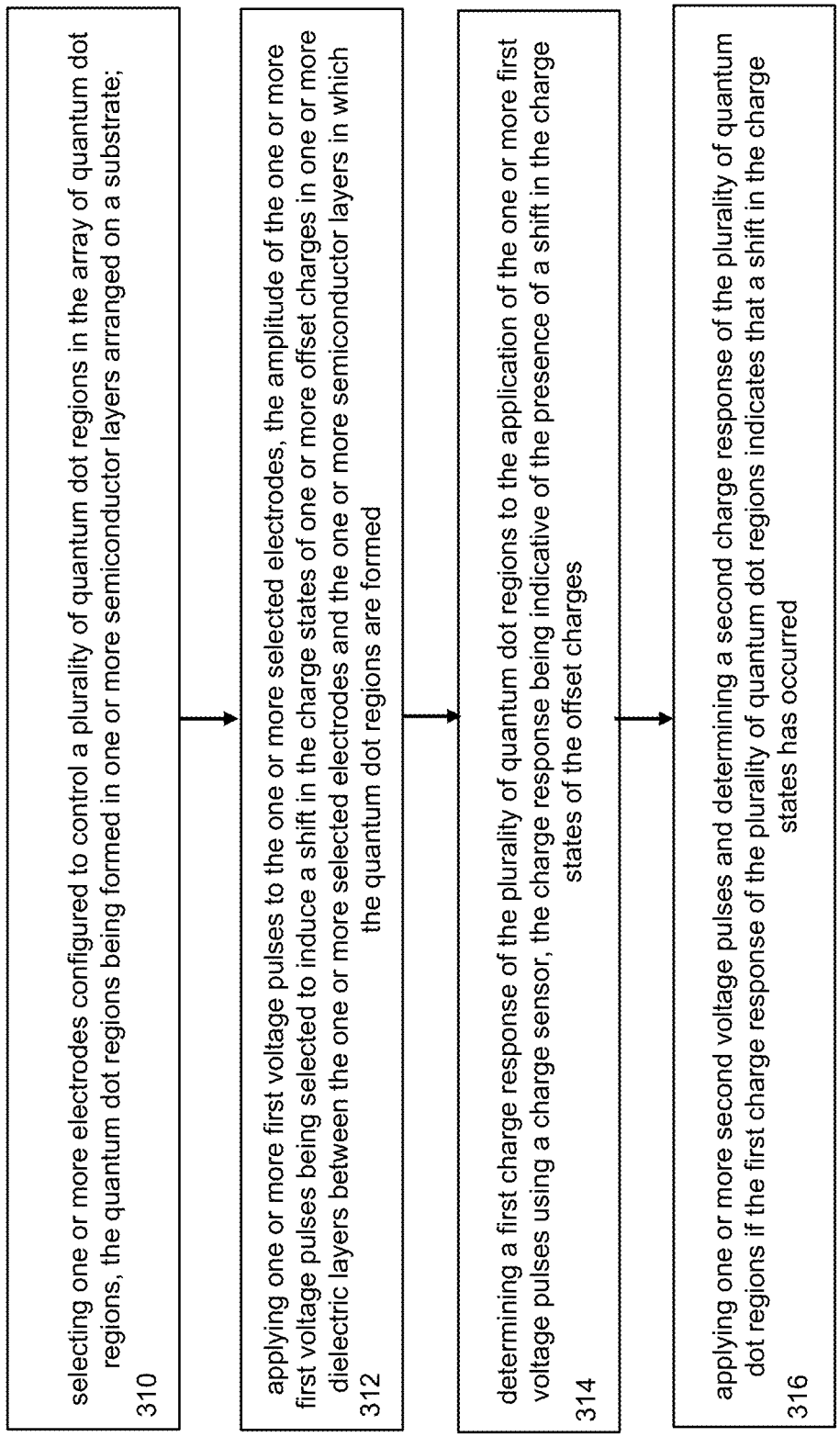

FIGS. 3A and 3B schematically a controller configured to equalize the effect of random offset charges in a quantum dot array and a method of equalize the effect of offset charges in a quantum dot array according to an embodiment of the invention. As shown in the figure a controller 306, e.g. a computer, may be connected via control electronics $304_{1-4}$ to an electrode structure that is configured to control the quantum dot regions $310_1$ in the array of quantum dots. The electrode structure may be arranged over the quantum dot array and may include electrodes for controlling the quantum dots regions, e.g. gate electrodes $318_i$ for forming a quantum well in the one or more semiconductor layer. Further, the electrode structure may include electrodes configured to control the coupling between quantum dots, e.g. barrier electrodes $312_i$, $314_i$ which may be arranged in a first and second direction, in this example a first diagonal direction and a second diagonal direction. Many different types of electrode configurations and orientations of the different electrodes, e.g. gate electrodes and barrier electrodes, are possible without departing from the essence of the invention. These electrodes may be connected to control electronics $304_{1-4}$ arranged along the sides of the quantum dot array which in turn are managed by the controller.

Further, readout structures for reading out the quantum dots may include a sensor 308, which may be configured to read out the quantum dot regions within the quantum dot array. Any suitable readout sensors for quantum dots may be used including, but not limited to current sensors, charge sensors and/or readout sensors. A current sensor may be used to determine current gate voltage I-$V_g$ characteristics of a quantum dot structure for different gate electrodes and/or barrier electrodes. In some embodiments, the sensors may be arranged at the side of the quantum dot array. For example, Li et al., describe in their article *a crossbar network for silicon quantum dot qubits*, Sci. Adv. 2018, a dispersive read sensor for reading out an array of quantum dots.

In FIG. 3A, an example is provided in which a charge sensor 308 may be arranged within the quantum dot array so that it can readout quantum dots that are located around the charge sensor. In an embodiment, the charge sensor may be configured as a single-electron tunneling (SET) transistor. Hence, SET transistor 308 is arranged within the quantum dot array (away from the edges) so that quantum dots may be readout by the SET transistor, which is connected via electrodes to the controller 306. As will be described hereunder in further detail, the electrode structure may include different electrodes provided over the quantum dot array in different layers separated by insulating layers and/or locally connected via nano-scale metallic vias through the insulating layers to make contact between conductive structures, including the semiconductor layers in which the quantum dots are formed.

Thus, in contrast to prior art quantum dot readout structures, in some embodiments, a SET transistor may be formed in a readout area within the array of quantum dots, wherein the source and drain electrodes of the SET transistor are formed in a different layer than the source and drain regions of the SET transistor and nanoscale metallic vias may galvanically connect the source and drain of the SET transistor with the source and drain electrodes. The SET readout structure is easily scalable by integrating a plurality of such SET readout structures regularly distributed over a large area quantum dot structure.

FIG. 3B depicts a flow chart of a method of controlling, in particular minimizing, the effect of random offset charges in a semiconductor structure comprising gated quantum structures according to the embodiments in this disclosure. The method may be executed by the controller as shown in FIG. 3A. Thus, as already described earlier, quantum structures may suffer from offset charges and/or variations in critical dimensions determined by the fabrication methods that are used. These offset charges have charge states that may influence the formation and control of the quantum structures. To eliminate or at least substantially reduce the offset charges a process may be executed wherein in first step 310 the controller may select one or more electrodes configured to control a plurality of quantum structures. Here, a quantum structure may be formed in one or more semiconductor layers arranged on a substrate. In some embodiments, a quantum structure may be a quantum dot. Further, the one or more electrodes may include one or more gate electrodes, each gate electrode being connected to a plurality of plunger gates, each plunger gate being arranged to form a quantum well in the one or more quantum dot regions. Alternatively and/or in addition, the one or more electrodes may include one or more barrier gate electrodes for controlling a barrier region between neighboring quantum dot regions in the plurality of quantum dot regions. Here, in some embodiments, at least two barrier electrodes may configured to locally control a barrier region between neighboring quantum dot regions.

Then, in a second step 312 the controller may apply one or more first voltage pulses to the one or more selected electrodes, wherein the amplitude of the one or more first voltage pulses may be selected to induce a shift in the charge states of one or more offset charges in one or more layers between the one or more selected electrodes and the one or more semiconductor layers in which the quantum structures are formed. Thus, the offset charges are subjected to a relatively high electric field, at least an electric field that is higher than the electric field associated with the voltage levels that are used during operation of the quantum dots (typically voltage ranges that are needed to form a quantum well with a few or one charge carrier). Due to this high field, the states in the offset charges may shift, e.g. because part of the states may be filled. This way, the offset charges may be effectively reduced. The pulses may have differ amplitudes, e.g. increase in amplitude. Further, the pulses may have different polarities.

The controller may then determine a first sensor response of the plurality of quantum dot regions that were subjected to the voltage pulses. Here, the sensor response signal may be determined by the sensor that is coupled to the quantum dots in the quantum dot array. The sensor response may be indicative of the presence of a shift in the charge states of the offset charges.

In an embodiment, the first sensor response may be determined by controlling the sensor to measure a first charge state of the one or more quantum structures before applying the one or more first voltage pulses and controlling the sensor to measure a second state of the one or more quantum structures after applying the one or more first voltage pulses. Then, based on the first and second charge state it may be determined if a shift in the charge states of the offset charges has occurred.

Then, in a further step 316 the controller may determine if the charge response of the one or more quantum structures indicate that a shift in the charge states has occurred. This may be a signal for the controller that it is possible to further adjust (minimize or equalize) the charge states of the offset charges. If that is the case, the controller may determine to apply one or more second voltage pulses to the one or more quantum structures and determining a second sensor response of the plurality of quantum dot regions. This process may be repeated until the voltages pulses do not cause any change in the charge response of the one or more quantum structures. This way, the effect of offset charges may be neutralized so that—for example—application of a gate voltage to a plurality of plunger gates will provide quantum dot regions that have substantially similar device characteristics.

The process in FIG. 3B may be repeated for different electrodes types, e.g. common gate electrodes and/or individually addressable barrier gates. Examples of such structures are described hereunder with reference to the figures. Once the process of minimizing the offset charges is finished, the controller may start operations on the quantum dot regions, e.g. configured quantum dot regions as qubit, apply operations to the qubits and readout of the qubit operations using the charge sensor. Additionally, in some cases, the process in FIG. 3B may be repeated after a predetermined time to ensure that charging effects minimized or reduced during operation.

Figure 4A:
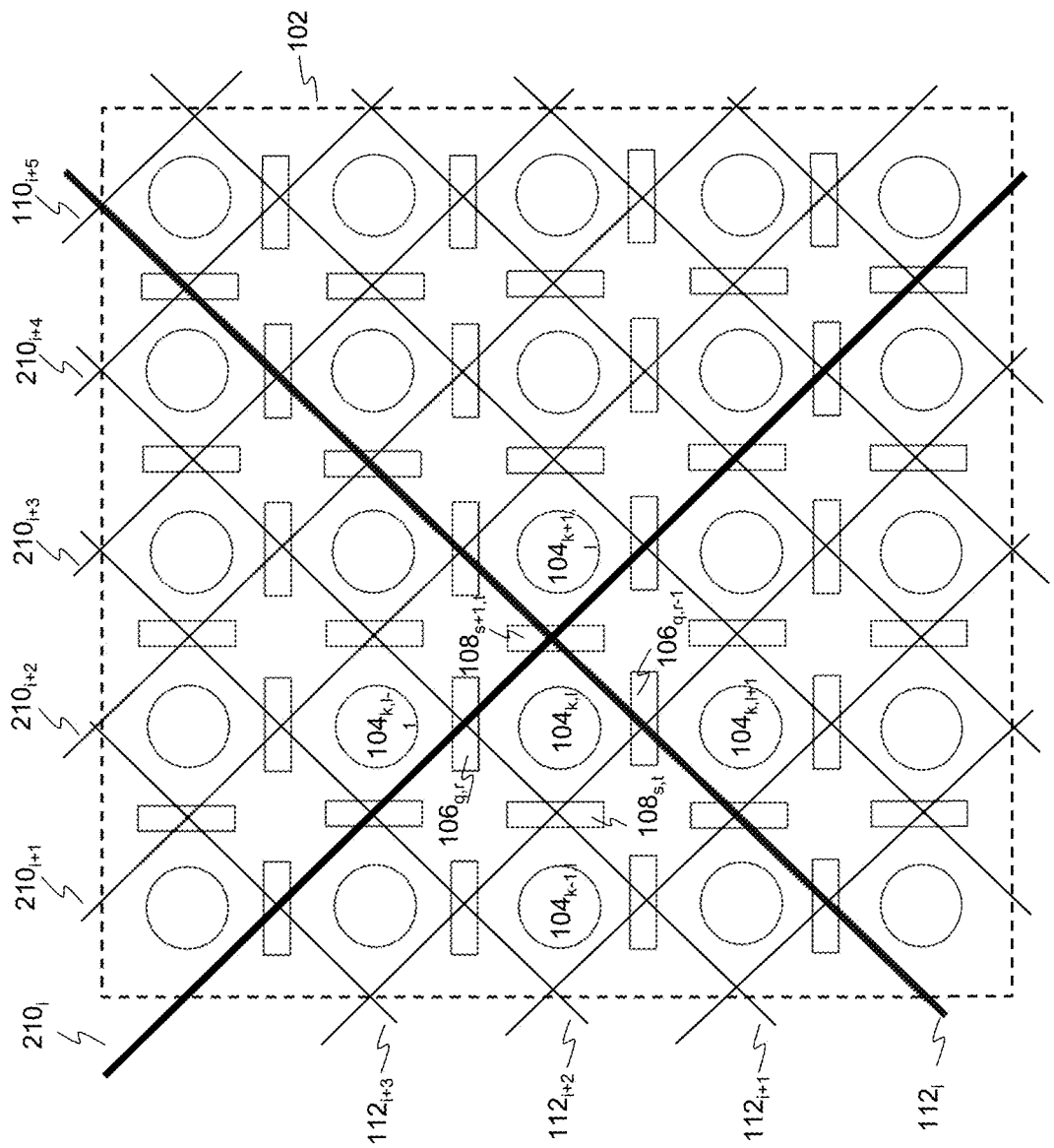
FIG. 4A-4B depict schematics of a quantum dot array comprising a scalable quantum dot coupling structure according to an embodiment of the invention.
Figure 4B:
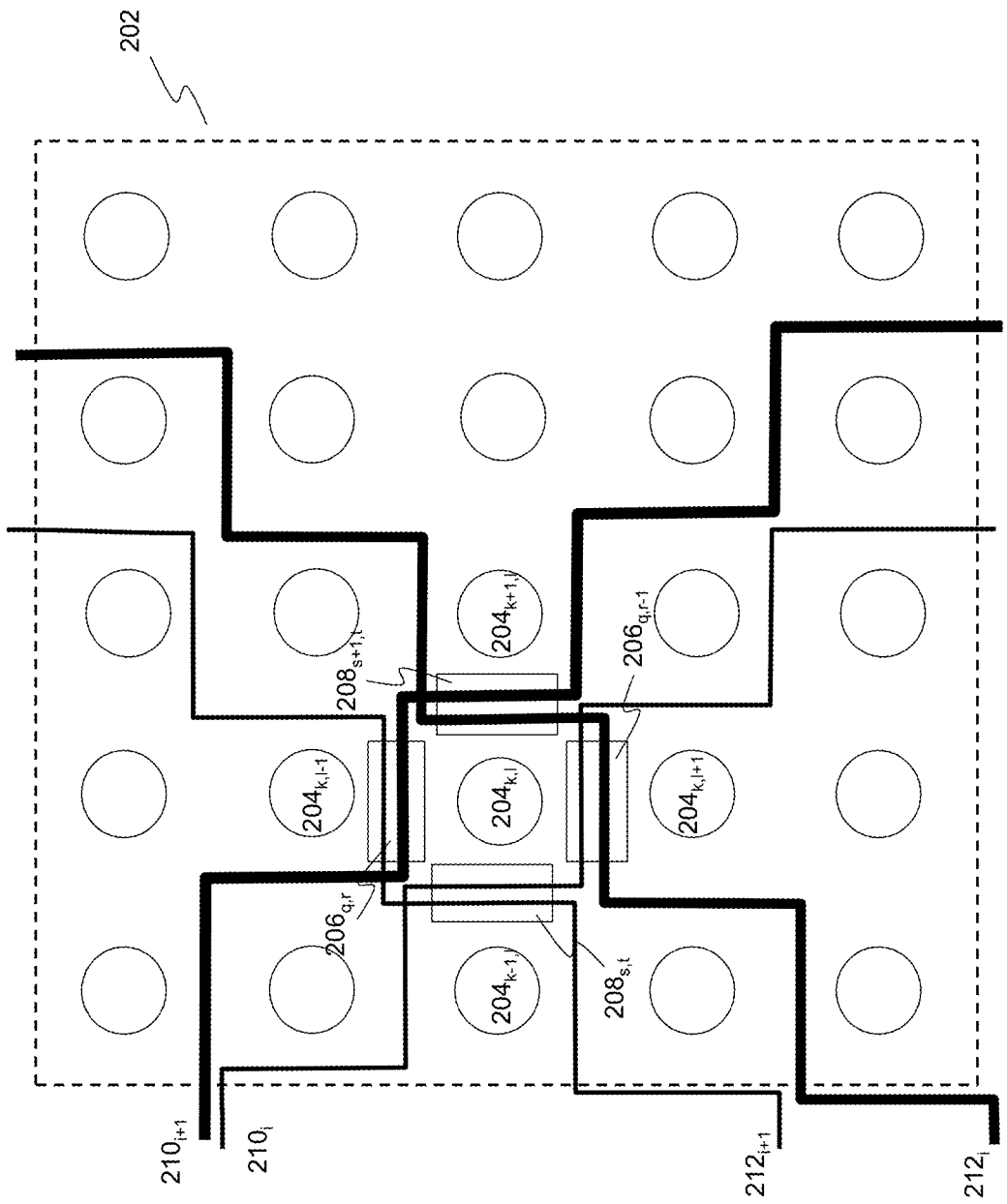

FIGS. 4A and 4B depict schematics of a quantum dot array comprising a scalable quantum dot coupling structure according to an embodiment of the invention. FIG. 4A represents a schematic top view of part of semiconductor substrate 402 comprising regions $404_{k,l}$ in which a quantum dot may be formed. The quantum states of a quantum dot, e.g. the spin state of a single charge carrier e.g an electron or hole in the quantum dot, may be used to configure and operate a quantum dot as a qubit. Different types of quantum dots may be envisaged, e.g. quantum dots formed in a stack of semiconductor layers in which a two-dimensional electron gas (2DEG) or a two-dimensional hole gas (2DHG) is formed. The quantum dot regions may be arranged in an array of k rows and l columns.

The quantum dot regions may be separated by barrier regions, in particular first barrier regions located between neighboring quantum dots in a row. These first barrier regions may be referred to as row barriers. Further, second barrier regions may be located between neighboring quantum dots in a column. These second barrier regions may be referred to as column barriers. This way, a quantum dot $404_{k,l}$ within the 2D array may have a plurality of neighboring quantum dots $404_{k-1,l}$, $404_{k+1,l}$, $404_{k,l-1}$, $404_{k,l+1}$, in this example four quantum dots, separated by first (column) barrier regions $406_{q,r}$, $406_{q,r-1}$ and second (row) barrier regions $408_{s,t}$, $408_{s+1,t}$. These barrier regions may be controlled based on barrier electrodes that are arranged over the substrate as shown in the figure.

A set of first barrier electrodes may be arranged in a first direction, in this example a first diagonal direction, over the substrate such that each first barrier electrode may be arranged over a plurality of column and/or row barriers regions. For example, in the embodiment depicted in FIG. 4A, the first barrier electrodes may be alternately arranged over column and row barriers in a first direction. Similarly, a set of second barrier electrodes may be arranged in a second direction, in this example a second diagonal direction, over the substrate such that second barrier electrode may be arranged over a plurality of column and/or barrier regions. For example, the second barrier electrodes may be alternately arranged over column and row barriers in a second direction. The electrodes may be arranged such that at each barrier region, two barrier electrodes, a first barrier electrode in a first direction, and a second barrier electrode, meet or cross each other. Although FIG. 4A depicts a diagonal arrangement of barrier electrodes, other angular arrangements e.g. horizontal and vertical, are also possible.

By controlling barrier electrodes $410_i$ and $412_i$, barrier region $408_{s+1,t}$ between neighboring quantum dots $404_{k,l}$, $404_{k+1,l}$ may be controlled. For example, a voltage for barrier electrodes $410_i$ and $412_i$, may be selected such that if a voltage is applied to both electrodes, coupling between quantum dots $104_{k,l}$, $104_{k+1,l}$ may be achieved.

FIG. 4B depicts a quantum dot array comprising a scalable quantum dot coupling structure according to an embodiment of the invention. In particular, the figure illustrates an implementation of the barrier electrodes for providing local coupling of quantum dots in the 2D array of quantum dots. In this particular embodiment, a set of staircase-shaped first barrier electrodes $410_i$, $410_{i+1}$ may be arranged in a first diagonal direction over a substrate 402 and a set of staircase-shaped second barrier electrodes $412_i$, $412_{i+1}$ may be arranged in a second diagonal direction over the substrate (for clarity reasons only a few (in this example four) barrier electrodes are visible in the figure).

The first and second set of staircase-shaped barrier electrodes may be arranged in the peripheral part of the areas that form the quantum dots. This way, further plunger gate electrodes can be arranged in the central part of the quantum dot area. Such plunger gates may be needed to create a quantum dot in the semiconductor layers. Each staircase barrier electrode includes vertical parts and horizontal parts. In order to electrically isolate the two sets of barrier electrodes, the electrodes may be formed in different layers on the substrate including at least one dielectric layer for electrically separating both barrier electrodes.

As shown in the figure, the barrier electrodes are arranged to define quantum dots $404_{k-1,l}$, $404_{k+1,l}$, $404_{k,l}$, $404_{k,l-1}$, $404_{k,l+1}$ separated by first (column) barrier regions $406_{q,r}$, $406_{q,r-1}$ and second (row) barrier regions $408_{s,t}$, $408_{s+1,t}$. A barrier region may be controlled by a first barrier electrode in the first diagonal direction and a second barrier electrode in the second diagonal direction. For example, vertical barrier region $408_{s+1,t}$ may be controlled by a vertical part of first barrier electrode $410_{i+1}$ and a vertical part of the second barrier electrode $412_i$. Similarly, horizontal barrier region $406_{q,r-1}$ may be controlled by a horizontal part of first barrier electrode $410_i$ and a horizontal part of the second barrier electrode $412_i$. For clarity reasons, only a few barrier electrodes $410_i$, $410_{i+1}$, $412_i$, $412_{i+1}$ are illustrated. Further barrier electrodes may be arranged over the substrate so that all barrier regions between the quantum dots can be locally controlled.

In operation, a voltage may be applied to a pair of barrier electrodes that cross each other above a barrier area between two quantum dots. The voltages may be selected such that a voltage applied to only one of the electrodes in the barrier areas still provides a sufficient potential barrier for decoupling the quantum dots. In contrast, applying a voltage to both electrodes that control vertical barrier region $408_{s+1,t}$ may lower the coupling barrier and allow coupling between the two quantum dots that are separated by this vertical barrier region.

Thus, the examples in these figures illustrate the use of barrier electrodes that allow local control of a barrier region between two quantum dots in a large quantum dot array. It is submitted that the electrode structures depicted in FIG. 4B and is a non-limiting examples and many different variations exist without departing the essence of the invention.

Figure 5:
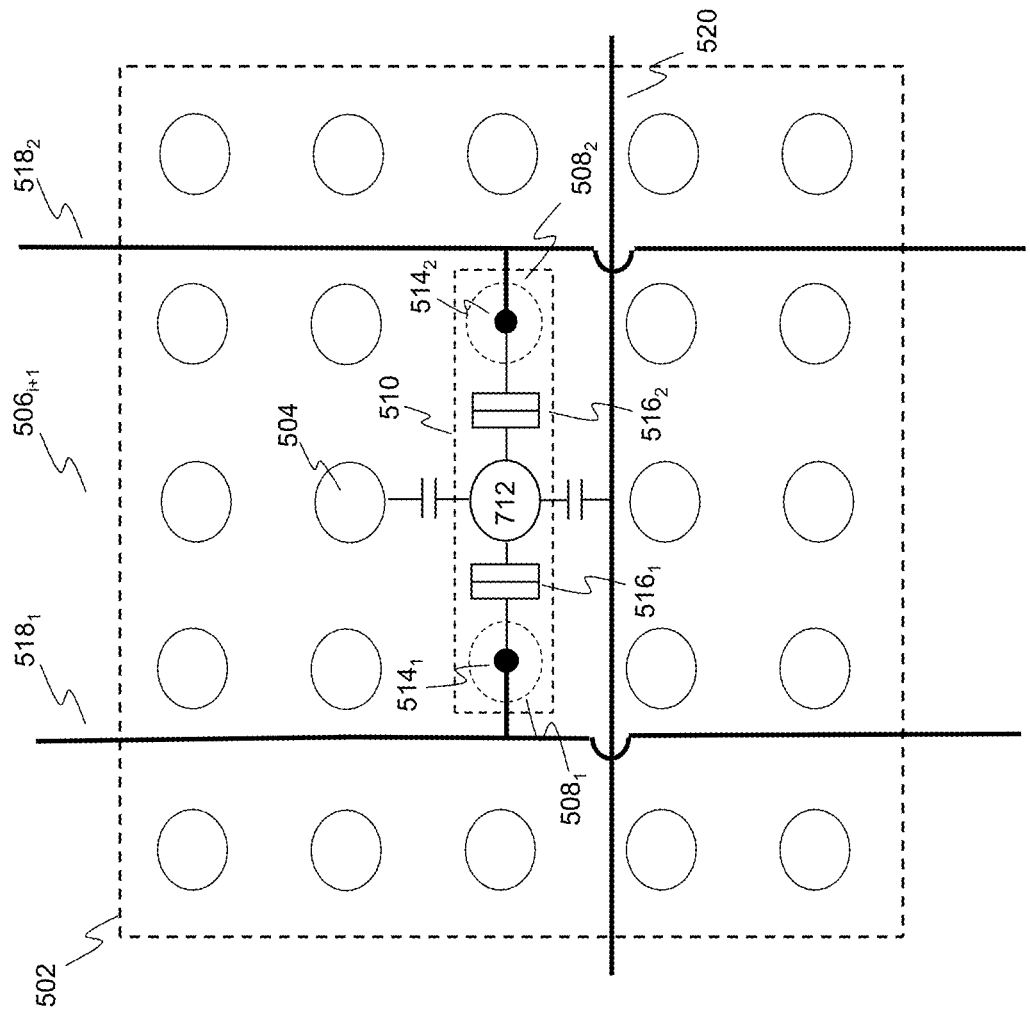
FIG. 5 depicts a schematic of a quantum dot array comprising an integrated SET readout structure according to an embodiment of the invention.

FIG. 5 depicts a schematic of a quantum dot array comprising an integrated SET readout structure according to an embodiment of the invention. In particular, FIG. 5 represents a schematic top view of part of semiconductor substrate 502 comprising regions 504 in which a quantum dot may be formed. The quantum states of a quantum dot, e.g. the spin state of a single charge carrier, e.g an electron or hole, in the quantum dot, may be operated as a qubit. Different types of quantum dots may be used, e.g. quantum dots formed in a stack of semiconductor layers in which a two-dimensional electron gas (2DEG) or a two-dimensional hole gas (2DHG) is formed. Such stack may be referred to as a quantum well stack, which are well known in the field. Quantum well stacks may be based on group IV type, group III-V and group II-VI type thin-film semiconductors layers. Other types of quantum dots which may be used with the embodiments in this disclosure include nano-wire type quantum dots, MOS-type quantum dots or self-assembled quantum dots.

Gate electrodes may be arranged over the substrate wherein each electrode may be connected to a plurality of plunger gates. Further, one or more dielectric layers may be used to separate the gate electrodes from the semiconductor layers in which the quantum dots are formed. A gate electrode may be used to control the potential of a row of quantum dots. In particular, such gate electrode may be used to control the number of charge carriers in the quantum dot. Examples of electrode structures for controlling the quantum dot and the SET transistor will be described hereunder in more detail.

A readout area 510 located inside (i.e. within) the quantum dot array may comprise a readout structure for quantum dots arranges around the readout structure. Thus, the SET transistor is located in the central part of the quantum dot array, away from the quantum dots that form the peripheral part of the quantum dot array. Quantum dot array 502 depicted in the figure may be part of an extended, densely packet quantum dot array of hundreds or even thousands quantum dot regions. For example, the quantum dot array including the SET readout structure may form a unit cell of a large area quantum dot array with a plurality of SET readout structures arranged within the quantum dot area.

In some of the embodiments, the readout area may include space for forming a single electron tunneling (SET) transistor within quantum dot array. The readout areas may include source and drain regions $508_{1,2}$ and a small conductive island 512 formed between the source and drain regions. The source and drain regions may be connected to source and drain electrode that are provided over the 2D quantum dot array. One or more dielectric layers may be used to separate the source and drain electrode from the gate electrode.

Metallic nano-scale vias $514_{1,2}$ in the dielectric layer may be used to electrically connect the source and drain regions of the SET in the semiconductor layer with the source and drain electrodes. The SET island may be connected to the source and drain regions via tunnel barriers $516_{1,2}$. Further, a SET transistor gate line 520 may be connected to a plunger gate that is capacitively coupled to the island of the SET transistor. The SET gate electrode may be used to tune the SET transistor so that it can be used as a highly sensitive charge sensor for sensing charge transitions in quantum dots, e.g. quantum dot 504, that is capacitively coupled to the metallic island of the SET transistor.

In some embodiments, the barriers regions between the quantum dots in FIG. 5 may be locally controlled using barrier electrodes. Quantum dots may be configured as qubits and by locally controlling a barrier region between two qubits, the coupling between the qubits can be controlled. The state of the quantum dots before and after interaction can be measured using the SET transistor as a highly sensitive charge sensor which is capacitively coupled to the quantum dots.

FIG. 6-11 illustrate a method for forming a quantum dot structure including an integrated SET structure according to an embodiment of the invention. These integrated structures may be realized based on fabrication techniques that are known in the field of semiconductor technology, including thin-film deposition techniques such as chemical vapor deposition CVD, atomic layer deposition ALD, molecular beam epitaxy MBE, thermal evaporation, electron beam evaporation, or sputtering, and lithography techniques and dry and/or wet (selective) etching techniques based on patterned masks. In particular, FIG. 6A-6C depict a top view and two cross sections of a semiconductor structure after first fabrication steps in which a first barrier electrode structure is formed on a semiconductor structure. As shown in FIGS. 6B and 6C, the semiconductor structure includes a substrate 600 comprising one or more semiconductor layers 604 in which quantum wells may be formed. For example, a quantum well may be formed in the semiconductor layers by applying a voltage to a plunger gate that is realized over the quantum dot region 608 as defined by the electrode structure. Examples of such plunger gate structures are described hereunder in more detail.

Figure 6B:
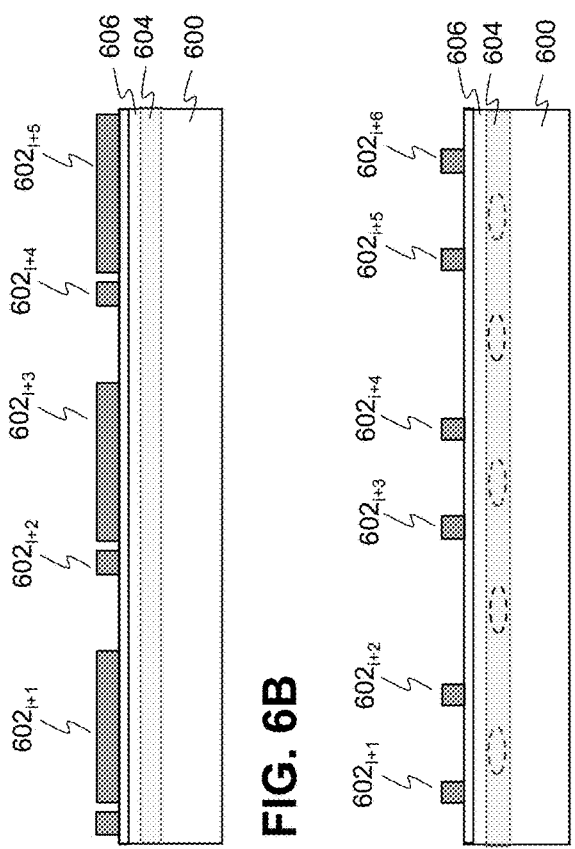
FIG. 6A-6C depict a top view and two cross sections of a semiconductor structure according to an embodiment of the invention comprising a first barrier electrode structure.
Figure 6C:
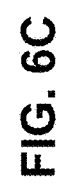
Figure 6A:
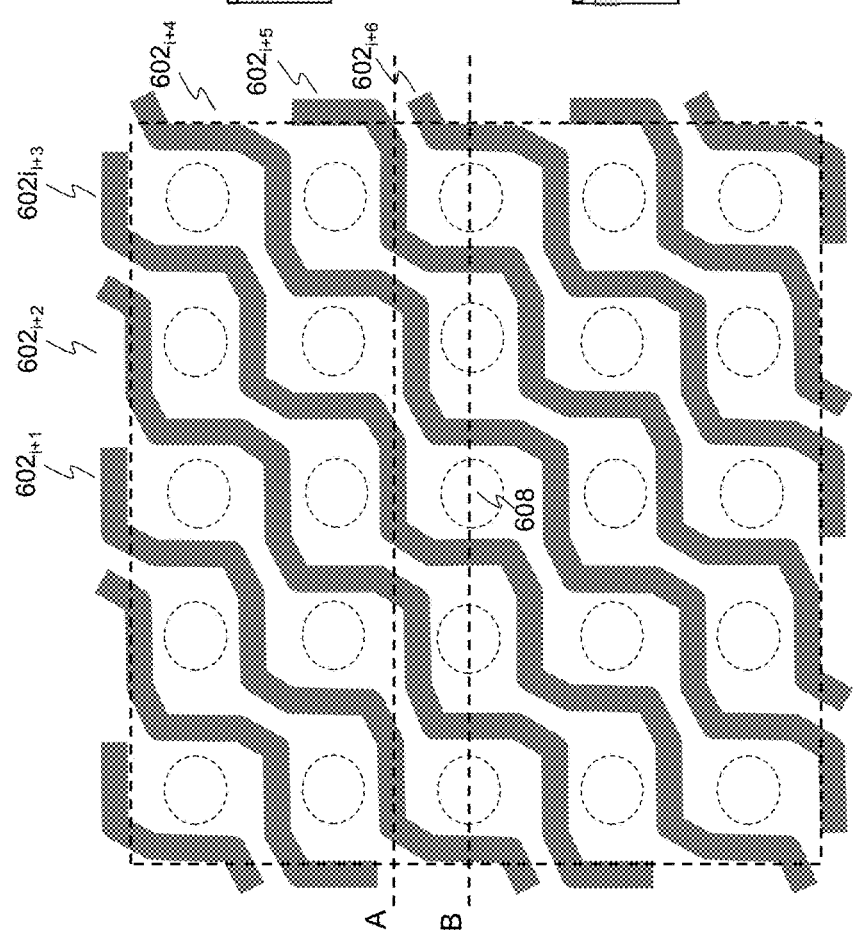

A first insulating layer 606 may be formed over the semiconductor layers. As shown in FIG. 6A, a first patterned metallic layer comprising a plurality of first barrier electrodes $602_{i+1}$, $602_{i+2}$, $602_{i+3}$, $602_{i+4}$, $602_{i+5}$, $602_{i+6}$ may be formed over the insulating layer in a first direction, in particular a first diagonal direction. As shown in FIG. 6A, the first barrier electrodes have a staircase shape comprising horizontal and vertical parts arranged at the peripheral area of quantum dot regions 608.

FIG. 7A-7C depict a top view and two cross sections of the semiconductor structure after second fabrication steps in which a second insulating layer 704 is formed over the first barrier electrodes. Further, a second patterned metallic layer comprising a plurality of second barrier electrodes $702_{i+1}$, $702_{i+2}$, $702_{i+3}$, $702_{i+4}$, $702_{i+5}$, $702_{i+6}$ is formed over the second insulating layer in a second direction, in particular a second diagonal direction. As shown in FIG. 7A, also the second barrier electrodes may have a staircase shape comprising horizontal and vertical parts arranged at the peripheral areas of quantum dot regions 708. The resulting electrode structure form a barrier electrode structure including staircase type electrodes arranged in two opposite diagonal directions, defining quantum dot regions in which quantum wells may be formed, separated by barrier regions. The double barrier gate structure provided over the barrier regions are used to locally control the coupling between neighboring quantum dots. This way, a barrier electrode structure is formed that is similar to the barrier structure described with reference to FIG. 4A allowing locally addressable coupling barriers in a two-dimensional quantum dot array.

Figure 8C:
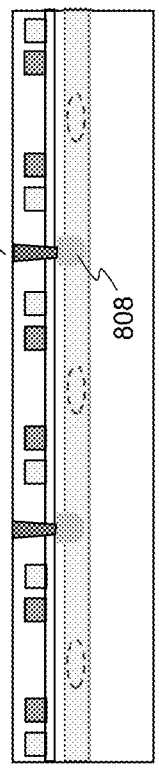
FIG. 8A-8C depict a top view and two cross sections of the semiconductor structure according to an embodiment of the invention.
Figure 8B:
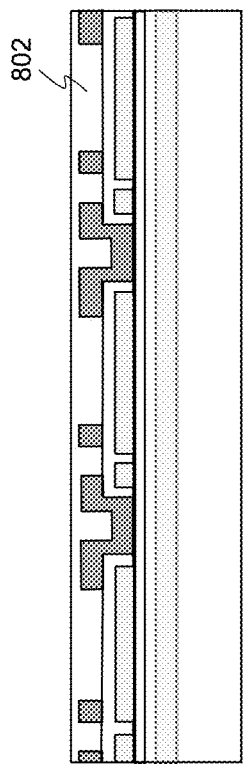
Figure 8A:
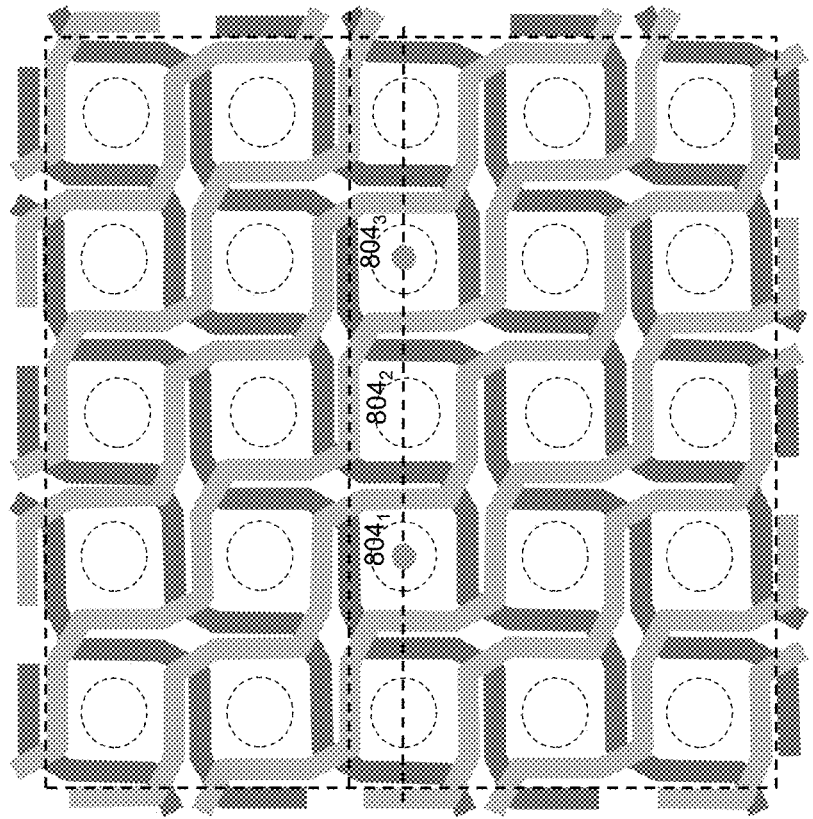

FIG. 8A-8C depict a top view and two cross sections of the semiconductor structure after third fabrication steps wherein a further third insulating layer 802 may be formed over the barrier electrode structure. Further, in this step a readout region within the quantum dot regions may be selected in which a SET transistor may be formed. The readout region may include a number of quantum dot regions $804_1, 804_2, 804_3$, in this example three quantum dot regions which may be used in the formation of source and drain regions of the SET transistor and the island of the SET transistor. Lithography and etching steps may be used to form nano-scale openings through the first, second and third insulating layer to expose at least one semiconductor layer of the one or more semiconductor layers in which the quantum dots are formed. Nano-scale metallic vias 806 are subsequently formed in the openings to provide a galvanic connection between areas in the semiconductor layer which may form the source and drain of a SET transistor and metallic electrode structures that are formed in further fabrication steps. The nano-scale metallic via may form a metal semiconductor contact. In some embodiments, a diffusion step may be used to form a diffusion area 808 at the metal semiconductor contact to improve ohmic behavior of the galvanic connection.

Figure 12:
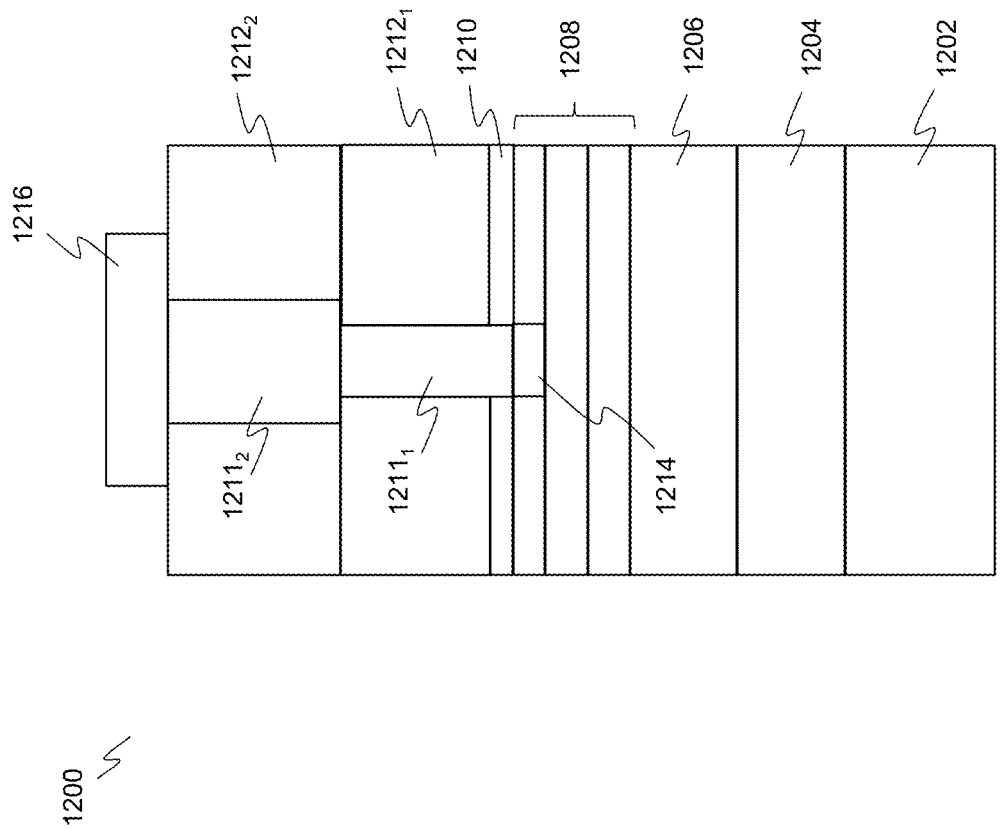
FIG. 12 depicts an ohmic connection to an integrated SET transistor readout structure according to an embodiment of the invention.

In an embodiment, a nanoscale metal contact structure may be used that is described with reference to FIG. 12. As shown in this figure, a silicon germanium SiGe quantum well structure 1208 may be provided on a silicon substrate 1202. A germanium layer and a graded silicon germanium layer may be provided between the silicon substrate and the quantum well structure. The silicon germanium quantum well may include a SiGe/Ge/SiGe strained quantum well structure. An example of such structure is described in the article by Sammak et. al., *Shallow and Undoped Germanium Quantum Wells: A Playground for Spin and Hybrid Quantum Technology*, Advanced Functional Materials, 23 Jan. 2019, which hereby may be incorporated by reference into this application. Further, a thin silicon capping layer and an insulating layer $1212_1$ may be provided over the quantum well structure. Vertical ohmic contacts to the germanium quantum well layer may be realized by forming a hole in the insulating layer and the capping layer using e.g. anisotropic reactive ion etching to expose the SiGe layer and forming a metal via $1211_1$ in the opening that contacts the SiG or Ge layer. An annealing step may provide some diffusion of the metal into the SiGe to form a direct metal contact with the Ge quantum well layer. Unlike silicon based platforms such as SiMOS or Si/SiGe heterostructures, Ge/SiGe do not require ion implantation in order to form low resistance p-type contacts. Instead a low resistance contact can be made by contacting the Ge quantum well layer directly. This way, nano-scale vias can be realized to directly contact the Ge layer. Further metallic via structures $1211_2$ in additional insulating layers $1212_2$ may be formed terminating the metal structure with an electrode 1216 that is provided on the surface of insulator $1212_2$. The cross-sectional dimensions of the nano-scale metallic vias (i.e. width and/or diameter) may be selected between 400 and 20 nm, preferably between 200 and 40 nm.

In an embodiment, metals for the metal vias include Al, Nb, NbN, TiN, NbTiN. These metals will become superconducting below a certain critical temperature. Thus providing very low loss electrodes. In a further embodiment, platinum may be used as a metal for the vertical vias thereby forming Pt—SiGe or Pt—Ge contact. An annealing step may be used to form an alloy at the interface of this contacts in to form a platinum silicide compound such as platinum silicide PtSi or platinum germanosilicide PtSiGe or a platinum germanide compound such as platinum germanide PtGe; These platinum silicide and germanide alloys will become superconducting below a critical temperature thus providing very low loss superconducting ohmic contacts with the quantum well.

Figure 9:
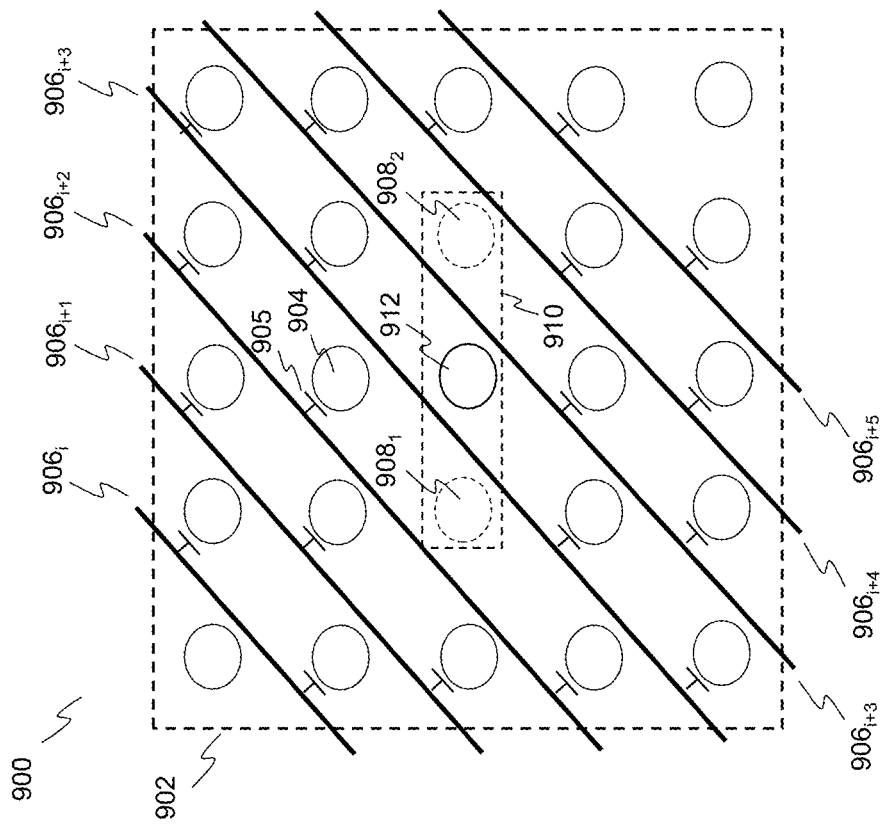
FIG. 9 depicts a schematic of a semiconductor structure according an embodiment of the invention.

The integrated semiconductor structure of FIG. 8 will subsequently be processed to form both an integrated SET transistor and a gate electrode structure as schematically illustrated in FIG. 9. This figure depicts a schematic of an integrated quantum dot structure including an array of quantum dot regions wherein quantum dot regions in a readout region 910 are configured as a SET transistor. The SET transistor may include a source region $908_1$ and drain region $908_2$ and an island 912 connected via tunnel barriers to the island. Further, quantum dot regions located around the SET transistor may include a gate structure, e.g. a plurality of electrodes arranged in a predetermined direction over the structure for inducing quantum wells in the quantum dot regions. A gate electrode may include a plurality of plunger gates, wherein a plunger gate 905 may be used to form a quantum well in the quantum dot region.

Figure 10B:
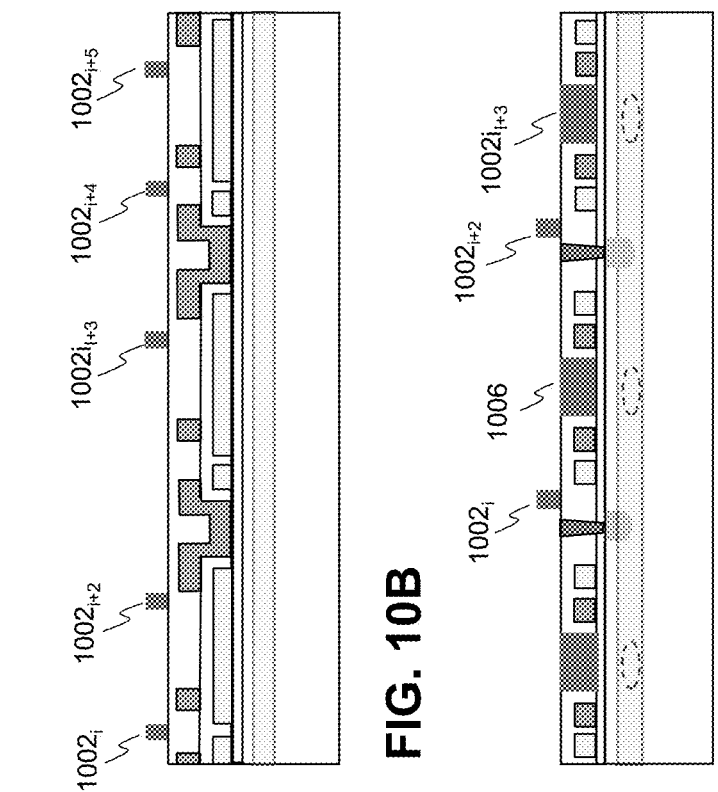
FIG. 10A-10C depict a top view and two cross sections of the semiconductor structure according to an embodiment of the invention.
Figure 10C:
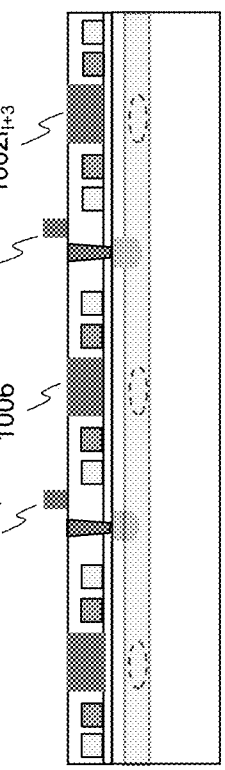
Figure 10A:
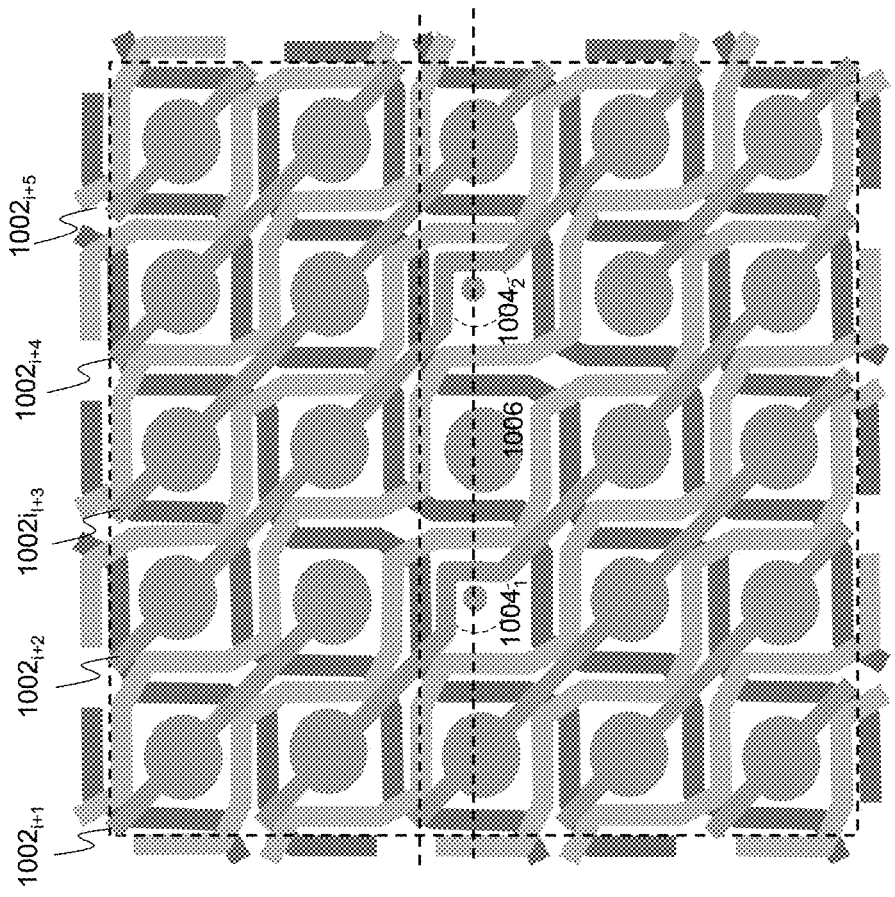

FIG. 10A-10C depict a top view and two cross sections of the semiconductor structure after fourth fabrication steps, which include the formation of a (plunger) gate electrode structures $1002_i, 1002_{i+1}, 1002_{i+2}, 1002_{i+3}, 1002_{i+4}, 1002_{i+5}$, on top of the semiconductor structure as shown in FIG. 8A-8C. Hence, each gate electrode defines a row (in this case a diagonal row) of plunger gates for the quantum dot areas, except for the quantum dot areas $1004_1, 1004_2, 1006$ that are located within the readout area for the SET transistor. As shown in FIG. 10A, when forming the electrode structure, a separate plunger gate 1006 for the SET transistor may be formed. Further, no plunger gates are formed at the dot regions $1004_1, 1004_2$ for allowing contact to the vias in a further process step. The formation of this structure may be realized based on lithography steps to form openings for the plunger gates and deposition steps for depositing metallic gate electrodes. These gate electrode structures may include plunger gates arranged in the center of the quantum dot regions so that when a voltage is applied to these gates a quantum well is formed in the one or more semiconductor layers.

Figure 11A:
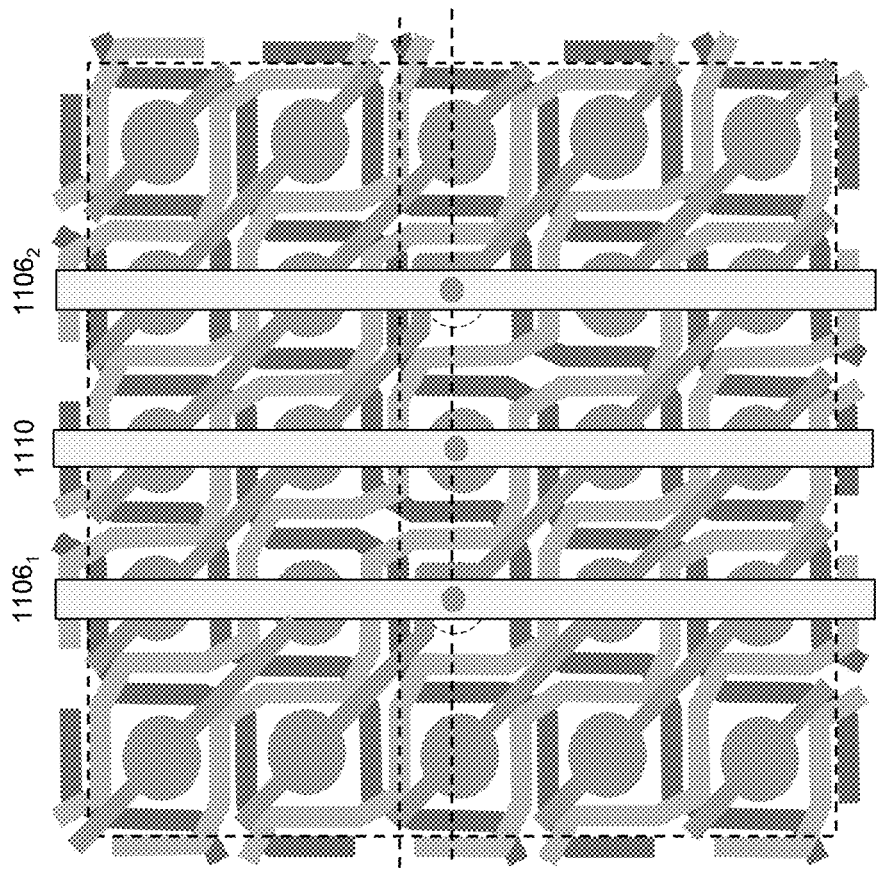
FIG. 11A-11C depicts a top view and two cross sections of the semiconductor structure according to an embodiment of the invention.
Figure 11B:
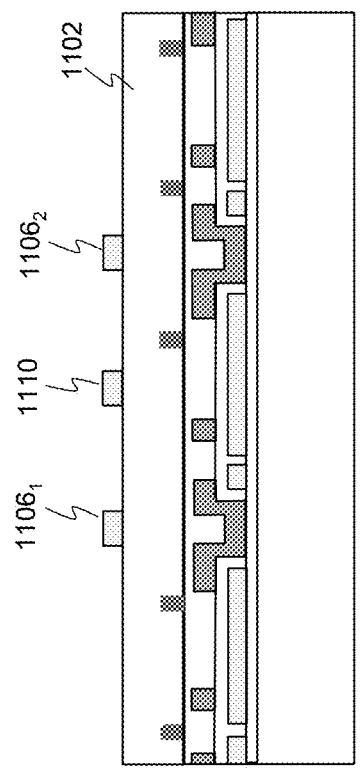
Figure 11C:
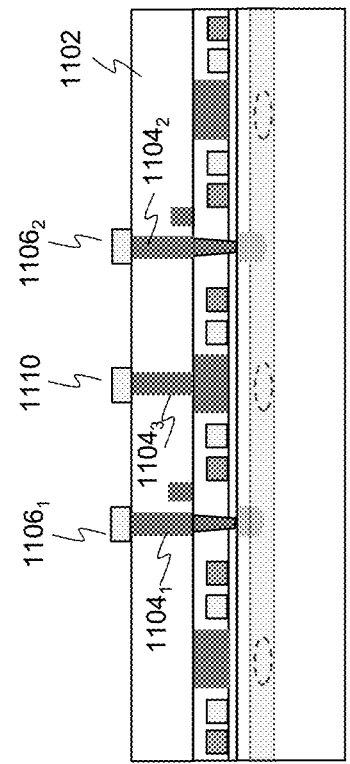

FIG. 11A-11C depict a top view and two cross sections of the semiconductor structure after fifth fabrication steps, which includes the formation of a fourth insulating layer 1102 over the semiconductor structure of FIG. 10A-10C and the formation of metallic vias $1104_1, 1104_2, 1104_3$ in the fourth insulating layer to provide a galvanic connection between the semiconductor layer and source and drain electrodes $1106_1, 1106_2$ and a connection between the plunger gate of the SET transistor and the SET gate electrode 1110, which are provided on the fourth insulating layer. Thereafter, further insulating layers and/or passivation layers may be provided over the semiconductor structure.

Hence, the formation of quantum dots structures comprising an integrated SET readout as described above allows dense integration of large area quantum dot structures. Further, the quantum dot structures include addressable barrier regions allowing quantum dots to be configured as qubits and allowing qubits to interact with each other.

Figure 13B:
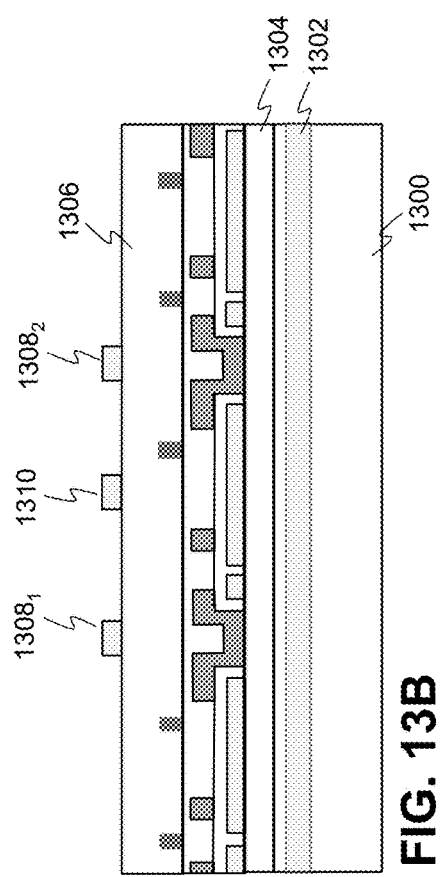
FIG. 13A-13C depicts an integrated SET-based readout structure for quantum dot arrays according to another embodiment of the invention.
Figure 13C:
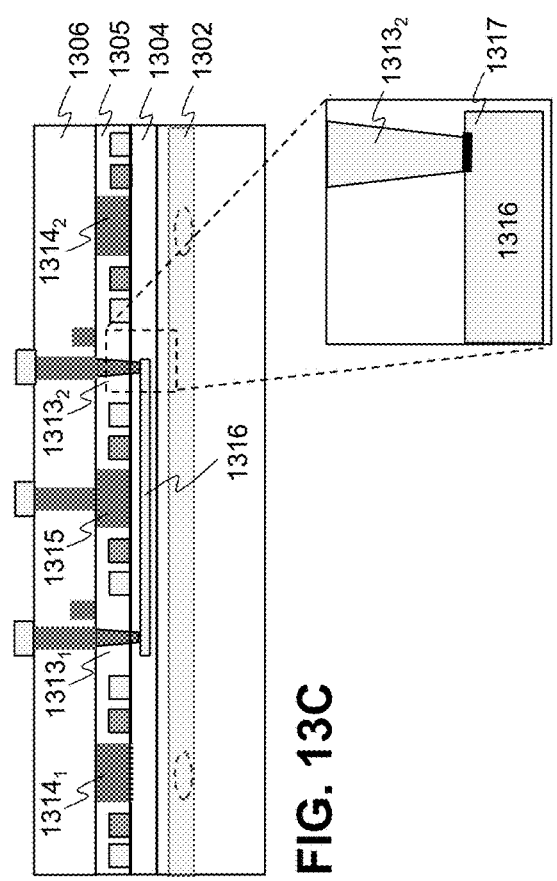
Figure 13A:
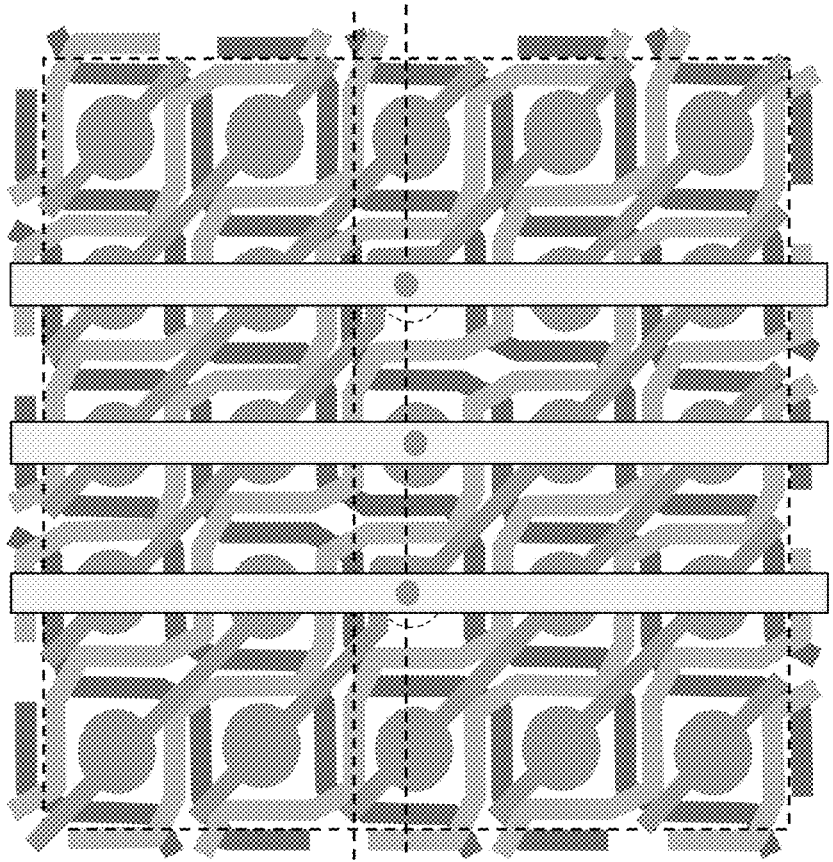

FIG. 13A-13C depict a top view and two cross sections of the semiconductor structure according to a further embodiment of the invention. This semiconductor structure is similar to the semiconductor structure described with reference to FIG. 11A-11C however in this embodiment the SET transistor is formed over the semiconductor layers.

As shown in the figures, the semiconductor structure includes a substrate 1300, one or more semiconductor layers 1302 provided over the semiconductor layers, a layer 1304 comprising a metallic island 1316 of the SET transistor, a layer including the barrier electrodes, the gate electrodes $1314_{1,2}$ for forming quantum wells in the semiconductor layers, metallic vias $1313_{1,2}$ connecting the metallic island with electrodes and a plunger gate 1315 for controlling the SET transistor and a layer for isolating the source, drain and gate electrodes of the SET electrodes from the rest of the electrode structures using vertical metallic vias. The tunnel junctions of the SET transistor may be formed during the formation of the metallic vias $1313_{1,2}$. For example, after realizing openings in the insulating layer 1305 to expose parts of the metallic island, a controlled oxidation process may be used to form an oxide layer 1117 that functions as a tunnel barrier. Thereafter, metallic vias may be realized so that a tunnel barrier is realized between the metallic island 1316 and the metallic via $1313_{1,2}$ as shown in the inset. Thus, also in this embodiment, a highly integrated SET readout structure is realized wherein the quantum dot regions are provided around the SET transistor.

Figure 14B:
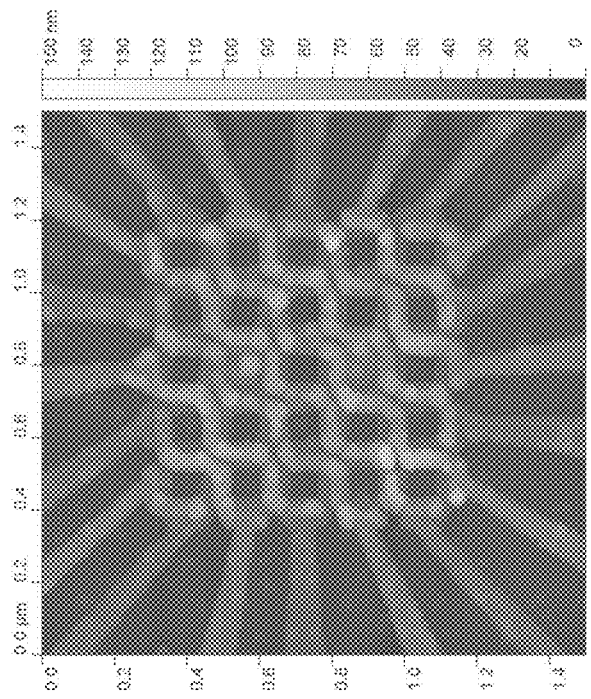
FIGS. 14A and 14B depicts pictures of 2D quantum dot arrays according to various embodiments of the invention.
Figure 14A:
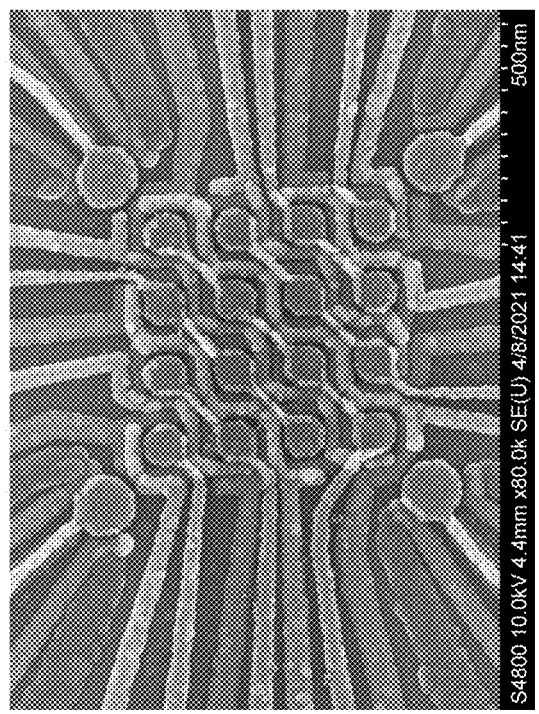

FIGS. 14A and 14B depicts pictures of 2D quantum dot arrays that are realized based (part of) the fabrication steps as described with reference to FIG. 6-11. FIG. 14A shows an example of a 4×4 quantum dot array comprising an addressable double barrier gate structure, but does not include array does not include a SET structure. FIG. 14B depicts a picture of a 5×5 quantum dot array including comprising an addressable double barrier gate structure and integrated SET structure as described with reference to the embodiments in this application.

Figure 15:
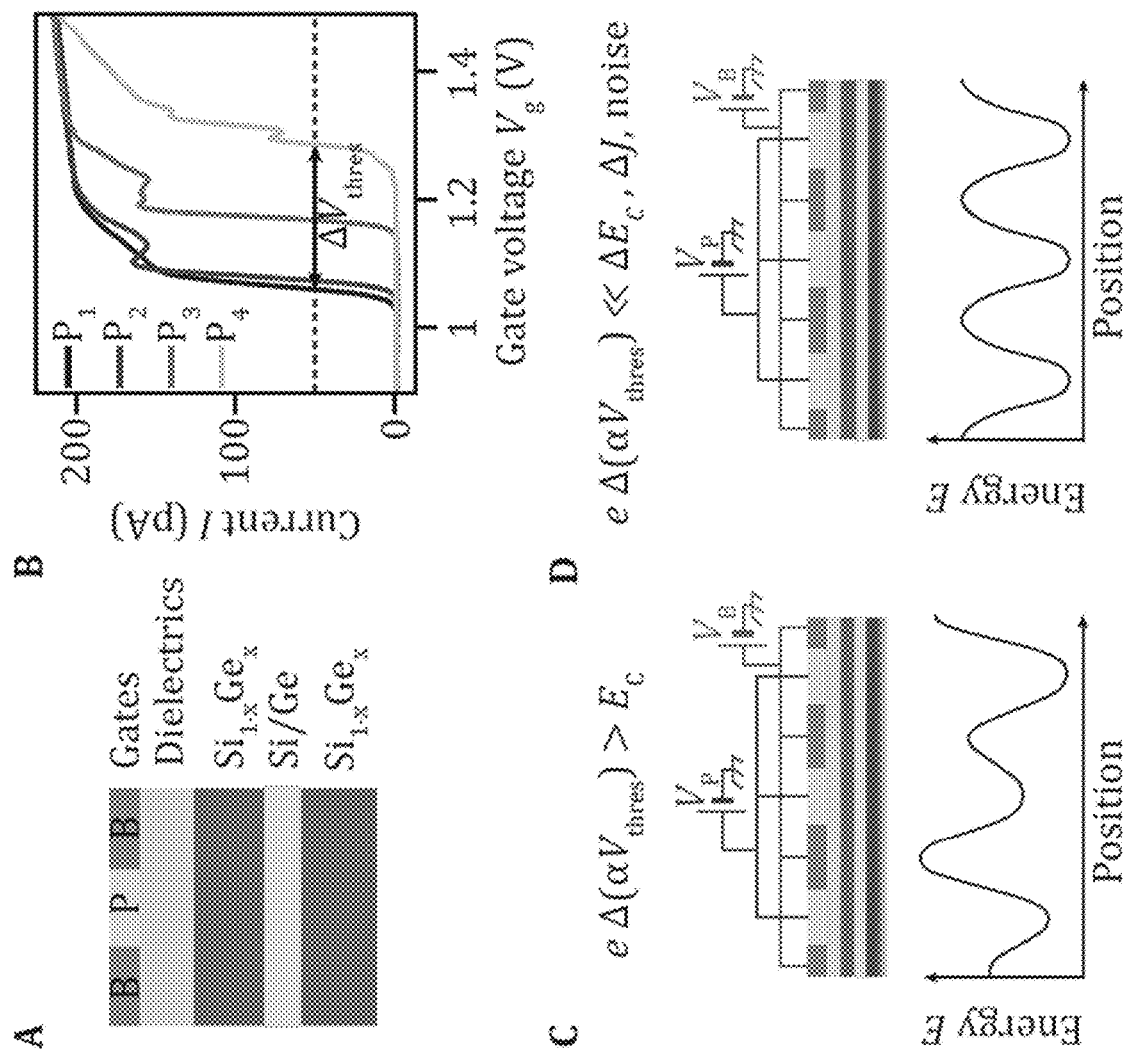

FIG. 15 shows the effect of potential fluctuations in semiconductor heterostructures comprising quantum dot devices. In particular, FIG. 15A depicts schematics of Si/SiGe and Ge/SiGe semiconductor heterostructures, including metallic gate electrodes representing respectively the barrier gate electrodes $1502_{1,2}$ (B) and plunger gate electrodes 1504 (P) of a quantum dot array. FIG. 15B shows that current gate voltage characteristics of such device will exhibit variations in the threshold voltage due to random offset charges in the vicinity of the gates. These fluctuations may be substantial. For example, application of shared gate arrangements, i.e. one gate voltage to multiple plunger gates and one gate voltage to multiple barrier gates in case when dot-to-dot variations (local fluctuations) are larger than the charging energy of the quantum dots, then the potential landscape under the gates will be irregular as shown in FIG. 15C. Such fluctuations would not permit implementation of shared gate arrangements. In contrast, application of one gate voltage to plunger gates and one gate voltage to the barrier gates in case when dot-to-dot variations (local fluctuations) are substantially smaller than or even negligible with respect to the charging energy of the quantum dots, then the potential landscape under the gates will be regular as shown in FIG. 15D. Such circumstances would allow implementation of shared gate arrangements. The schemes in this application aim to homogenize/equalize the dot-to-dot variations due to random offset charges.

Figure 16A:
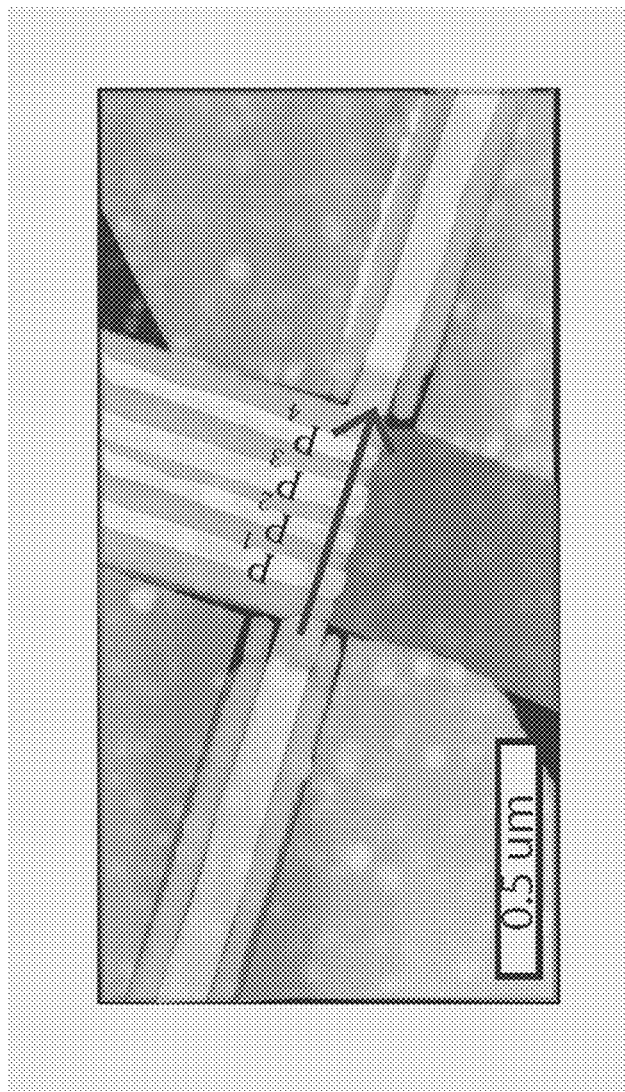
Figure 16B:
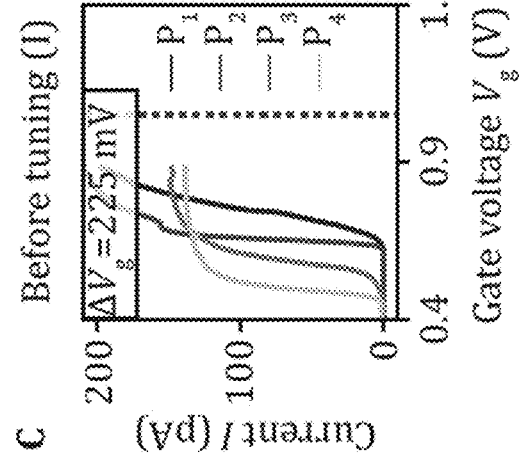

FIG. 16A-16D show a scheme for equalizing the potential below gates of a quantum element, such as an array of quantum dots. FIG. 16A is a scanning electron micrograph of a gate-based quantum dot structure, in this case a linear quantum dot array comprising four P1-P4 plunger gates connected to a source and drain. A voltage over the source and drain will cause a current (depicted by the arrow) to run through the dot structure, wherein the current is dependent on the voltages applied to the gates. FIG. 16B shows a graph of current (I) through the linear array as a function of the plunger gate voltage ($V_g$) for the different plunger gates. The curves show that the threshold voltages of the different plunger gates vary, which may be explained in terms of random offset charges in the neighborhood of the plunger gates. As shown in the graph, the spread in the values of the threshold voltage $V_{thres}$ for different plunger gates is in this case ΔVthres=225 mV. Here, the threshold voltage for the different gates provides a good metric for the dot-to-dot fluctuations. The threshold voltage may be defined as minimal voltage applied to a gate or a group of gates which the current reaches a particular current level, typically in the order of tens of pA.

To reduce the variability of the threshold voltages (i.e. homogenize the potential fluctuations under the gate) one or more voltage pulses of an amplitude higher than the threshold voltage associated with a gate are applied to the gates. Then, the change of the threshold voltage due to the one or more voltage pulses is measured based on I-$V_g$ curves. This process is repeated until the threshold voltages are equalized.

FIG. 16B depicts a schematic of the equalization process. As shown in the figure target threshold values $V_{i,target}$ may be set for each gate. Initially, the dot structure may have different initial threshold values $V_{i,0}$. Then, stress voltages $V_{i,stress}$ are applied to the gates to increase its threshold voltages to $V_{i,1}$, wherein the stress voltage applied to a gate is higher than its threshold voltage. This process may be repeated with increased stress voltages to progressively increase the threshold voltages until a condition is met. For example, in an embodiment, the stressing on gate $P_i$ may be stopped if the threshold voltage is equal to or larger than a target value, e.g. $V_{thres,i} > V_{target,i} = 1.05$ V. This process is repeated for each gate until the threshold voltages of the plunger gates $P_i$ (i=1, . . . , 4) are equalized. This way, the threshold voltages of the gates will progressively move towards the target values (the chronological order indicated by the dashed arrows) in Ni iterations, wherein some gates may reach the target voltage in less iterations than others.

Hence, voltage pulses are applied to the gates (also referred to as stress voltage pulses) in order to progressively modify the threshold voltages towards a target value. It is remarked that the invention is not limited to the scheme depicted in FIG. 6C. For example, instead of or in addition to tuning the threshold voltages of the gates by applying a stress voltage to an individual gate, the scheme may also include applying a stress voltage to two or more combined gates. Further, the tuning may also include measuring the threshold voltage of the two or more combined gates and use that threshold voltage in the tuning scheme. Additionally, instead of defining one target voltage for all gates, different target voltages for different gates may be defined. This way, the method may be used to tune the threshold voltage of a first set of gates to a first target voltage value and a second set of gates to a second target voltage value.

Figure 16D:
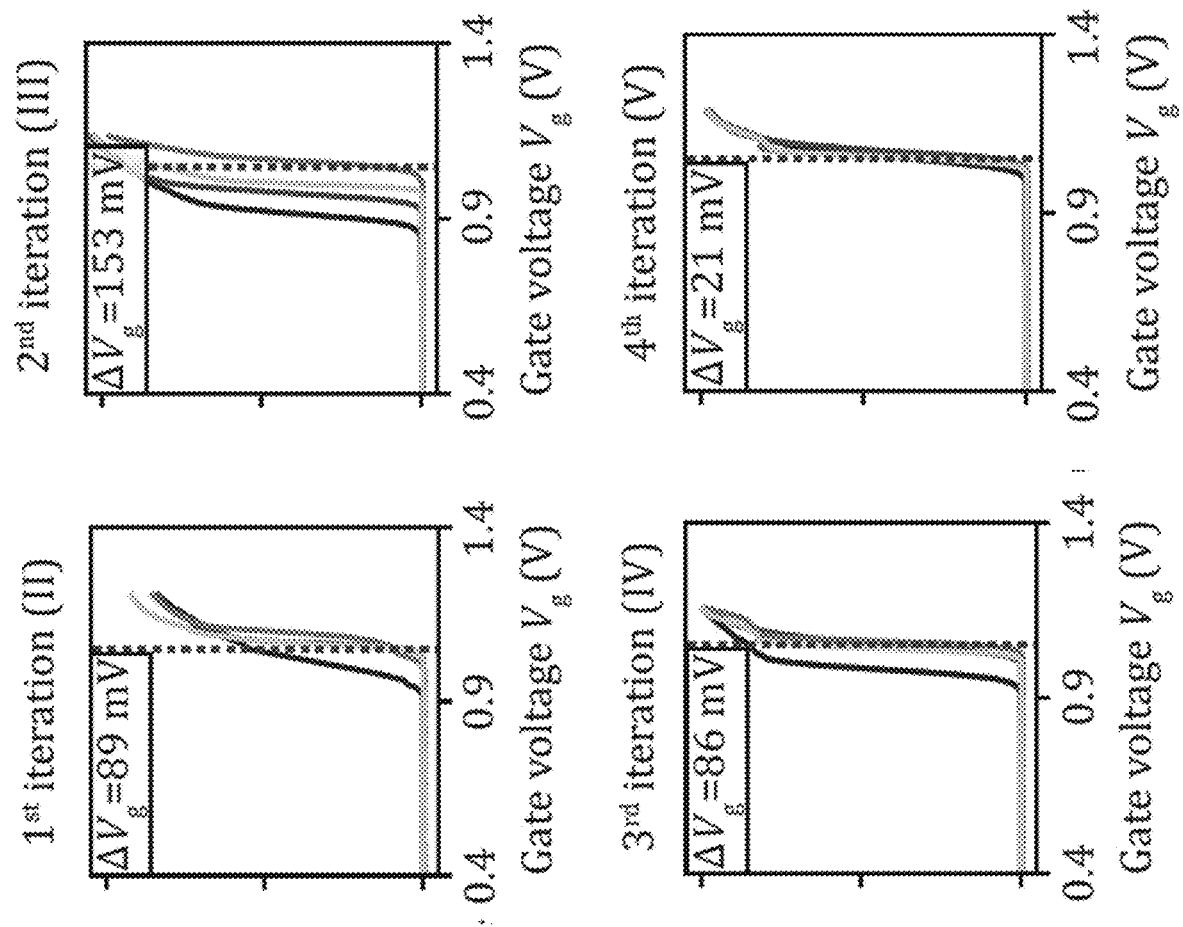

FIG. 16D shows the evolution of the gate voltage-current characteristics after several iterations of the above-described threshold voltage tuning procedure. The target voltage is marked by a dashed line. The graphs show four iterations wherein in each iteration voltage pulses are applied to the gates and the threshold voltages are measured. The graphs show that after four iterations the spread of the threshold voltage is reduced to $\Delta Vg=21$ mV, i.e. one order of magnitude below the initial one.

Hence, as shown in FIG. 16E, the scheme for equalizing electrostatic potential fluctuations, in particular dot-to-dot fluctuations, in an array of quantum dots generally includes the steps of:

determining initial threshold values for each of the gate electrodes or sets of gates electrodes of a quantum dot array (step 1602).

applying stress voltages to the gate electrodes or sets of gate electrodes wherein the stress voltages are selected to be higher than the initial threshold values in order to increase the threshold voltages for each of the gate electrodes or sets of gate electrodes towards a target threshold voltage (steps 1604);

repeating the application of stress voltages to the gate electrodes or sets of gate electrodes, wherein the stress voltages are selected to be higher than the threshold values of the gate electrodes or set of gate electrodes, until the threshold voltages for each of the gate electrodes or sets of gate electrodes have reached the target threshold voltage (step 1606);

These figures show that the scheme can be used to substantially equalize the threshold voltages associated with gates of quantum dots arrays. Additionally, the scheme also shows that the threshold voltages of the gates can be set to a predetermined threshold value. The method can be used to equalize any type of electrostatic gate that is used for controlling a quantum dot, including but not limited to plunger gates and/or barrier gates, including single and multi-barrier gate structures. Although the scheme is described on the basis of a linear quantum dot array, it is clear that this scheme can be used to different quantum dot array geometries and architectures including but not limited to 2D quantum dot arrays. Further, schemes can be applied to different quantum dot implementation, e.g. silicon or germanium quantum dot devices.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention claimed is:

1. A method of controlling random electrostatic potential fluctuations in on an array of quantum dot structures comprising:
  selecting one or more gate electrodes from a plurality of gate electrodes configured to electrostatically control quantum dot structures of the array of quantum dot structures formed in one or more semiconductor layers arranged on a substrate, each of the one of more gate electrodes being associated with an initial threshold voltage; and,
  applying stress voltage pulses to the one or more gate electrodes to progressively modify a threshold voltage of each of the one or more gate electrodes from an initial threshold voltage towards a target threshold voltage, wherein amplitude of the stress voltage pulses are selected to modify the random electrostatic potential fluctuations so that one or more threshold voltages of the one or more gate electrodes respectively are modified towards the target threshold voltage, the random electrostatic potential fluctuations being associate one or more random traps, defects, donor implants or acceptor implants, in one or more dielectric layers, semiconductor layers or interface layers between the one or more gate electrodes and the one or more semiconductor layers in which the array of quantum dot structures are formed.

2. The method according to claim 1 wherein the method further includes:
  measuring a modification in the electrostatic potential fluctuations in response to the application of the stress voltage pulses.

3. The method according to claim 2 wherein the modification is measured by determining a change in a threshold voltage associated with the one or more gate electrodes.

4. The method according to claim 2 wherein the modification is measured using a charge sensor.

5. The method according to claim 4 wherein measuring the modification in the electrostatic potential fluctuations includes:
  controlling the charge sensor to measure a first charge state of the quantum dot structures of the array of quantum dot strutures before applying the stress voltage pulses;
  controlling the charge sensor to measure a second charge state of the quantum dot structures of the array of quantum dot strutures after applying the one or more stress voltage pulses; and
  determining based on the first and second charge state the modification in the electrostatic potential fluctuations.

6. The method according to claim 5, wherein the method further includes:
  if a response of the charge sensor indicates a modification of the electrostatic potential fluctuations, applying one or more further stress voltage pulses and determining one or more further sensor responses of the quantum dot structures of the array of quantum dot strutures until the one or more further sensor responses indicate that the electrostatic potential fluctuations are equalized.

7. The method according to claim 1 wherein the plurality of gate electrodes include one or more plunger gates, each plunger gate being arranged to form a quantum well in the array of quantum dot structures.

8. The method according to claim 1 wherein the plurality of gate electrodes include one or more barrier electrodes for controlling a barrier region between neighboring quantum dot structures in the array of quantum dot structures.

9. The method according to claim 8 wherein at least two barrier electrodes are configured to locally control a barrier region between the neighboring quantum dot structures.

10. The method according to claim 4 wherein the charge sensor comprising a single electron tunneling (SET) transistor, the SET transistor comprising a source and a drain connected by tunneling junctions to a conductive island.

11. The method according to claim 1 wherein the array of quantum dot structures include quantum dot regions, nano wires or hut wires.

12. A controller for controlling random electrostatic potential fluctuations in an array of quantum dot structures, the controller being configured to:
selecting one or more gate electrodes from a plurality of gate electrodes configured to electrostatically control quantum dot structures of the array of quantum dot strutures formed in one or more semiconductor layers arranged on a substrate, each of the one or more gate electrodes being associated with an initial threshold voltage; and
applying stress voltage pulses to the one or more gate electrodes to progressively modify a threshold voltage of each of the one or more gate electrodes from an initial threshold voltage towards a target threshold voltage, wherein amplitudes of the stress voltage pulses are selected to modify the random electrostatic potential fluctuations so that one or more threshold voltages of the one or more gate electrodes respectively are modified towards the target threshold voltage, the random electrostatic potential fluctuations being associated with one or more random traps, defects, donor implants or acceptor implants, in one or more dielectric layers, semiconductor layers of interface layers between the one or more gate electrodes and the one or more semiconductor layers in which the quantum dot structures of the array of quantum dot strutures are formedmed.

13. The controller according to claim 12 wherein the controller is further configured to:
measure a modification in the random electrostatic potential fluctuations in response to applying stress voltage pulses.

14. The controller according to claim 12 wherein the controller is further configured for:
controlling a charge sensor to determine a first-sensor response in response to the applying stress voltage pulses, the first-sensor response being indicative of a modification in the random electrostatic potential fluctuations.

15. The controller according to claim 14 wherein controlling the charge sensor to determine the sensor response further comprises:
controlling the charge sensor to measure a first charge state of the quantum dot structures of the array of quantum dot strutures before applying the stress voltage pulses;
controlling the charge sensor to measure a second charge state of the quantum dot structures of the array of quantum dot strutures after applying the one or more stress voltage pulses; and
determining based on the first and second charge state a modification in the random electrostatic potential fluctuations.

16. The controller according to claim 14, wherein the controller is further configured to:
if the sensor response indicates a modification in the random electrostatic potential fluctuations, applying one or more further stress voltage pulses and determining one or more further sensor responses of the quantum dot structures of the array of quantum dot strutures until the one or more further sensor responses indicate that the random electrostatic potential fluctuations are equalized.

17. A method for equalizing electrostatic potential fluctuations in an array of quantum dots comprising:
determining initial threshold values for gate electrodes or sets of gates electrodes of the array of quantum dots;
applying stress voltages to the gate electrodes or sets of gate electrodes wherein the stress voltages are selected to be higher than initial threshold values in order to increase threshold voltages for the gate electrodes or sets of gate electrodes towards a target threshold voltage; and,
repeating the application of the stress voltages to the gate electrodes or sets of gate electrodes, wherein the stress voltages are selected to be higher than the initial threshold values of the gate electrodes or set of gate electrodes, until the threshold voltages for the gate electrodes or sets of gate electrodes have reached the target threshold voltage.

18. The computer program product comprising software code portions configured for, when run in memory of a computer, executing the method steps according to claim 1.

19. The method according to claim 3 wherein the threshold voltage defines a minimum voltage value at which conductance through the quantum dots in the array of quantum dots is measured.

20. The method according to claim 10 wherein the SET transistor is formed in the one or more semiconductor layers.

* * * * *